United States Patent
Koskas et al.

(10) Patent No.: US 11,518,495 B2
(45) Date of Patent: Dec. 6, 2022

(54) COMPOSITE STRUCTURAL ELEMENTS

(71) Applicant: ISRAEL AEROSPACE INDUSTRIES LTD., Lod (IL)

(72) Inventors: Elie Koskas, Rosh Haayin (IL); Victor Weissberg, Holon (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 16/981,499

(22) PCT Filed: May 2, 2019

(86) PCT No.: PCT/IL2019/050490
§ 371 (c)(1),
(2) Date: Sep. 16, 2020

(87) PCT Pub. No.: WO2019/211852
PCT Pub. Date: Nov. 7, 2019

(65) Prior Publication Data
US 2020/0407040 A1    Dec. 31, 2020

(30) Foreign Application Priority Data

May 3, 2018    (IL) .......................................... 259149

(51) Int. Cl.
*B64C 1/06* (2006.01)
*B64C 3/20* (2006.01)
(Continued)

(52) U.S. Cl.
CPC ................ *B64C 3/20* (2013.01); *B64C 1/065* (2013.01); *B64C 3/185* (2013.01);
(Continued)

(58) Field of Classification Search
None
See application file for complete search history.

(56) References Cited

U.S. PATENT DOCUMENTS

| | | |
|---|---|---|
| 4,606,961 A | 8/1986 | Munsen et al. |
| 4,715,560 A | 12/1987 | Loyek |

(Continued)

FOREIGN PATENT DOCUMENTS

| | | |
|---|---|---|
| EP | 1918089 A2 | 5/2008 |
| EP | 2749405 A1 | 7/2014 |

(Continued)

OTHER PUBLICATIONS

Machine translation of JP2009-178863 (Year: 2021).*

*Primary Examiner* — Alexander S Thomas
(74) *Attorney, Agent, or Firm* — Dorsey & Whitney LLP

(57) ABSTRACT

A composite structural member including at least one first flange element made from a first composite material, and at least one first web element made from a second composite material. The at least one first web element is connected to at least one first flange element in a non-coplanar manner along a corresponding mutual first edge via a first corner element made from a third composite material, the mutual first edge extending along a first direction. The third composite material includes a corresponding first plurality of third composite material first fibers and a corresponding second plurality of third composite material second fibers embedded in a corresponding third composite material matrix in a non-parallel orientation with respect to the third composite material first fibers, wherein the third composite material first fibers are nominally orthogonal to the mutual first edge or to the first direction.

17 Claims, 15 Drawing Sheets

(51) Int. Cl.
  *B64C 3/18* (2006.01)
  *B64C 1/00* (2006.01)
(52) U.S. Cl.
  CPC ............ *B64C 2001/0072* (2013.01); *Y10T 428/24174* (2015.01); *Y10T 428/24198* (2015.01)

(56) References Cited

U.S. PATENT DOCUMENTS

| | | | |
|---|---|---|---|
| 5,576,086 A * | 11/1996 | Narazaki | B29C 37/005 248/300 |
| 7,678,437 B2 * | 3/2010 | Escobar Benavides | B32B 15/14 428/57 |
| 7,837,148 B2 | 11/2010 | Kismarton et al. | |
| 7,926,761 B2 | 4/2011 | Coupe et al. | |
| 9,272,769 B2 | 3/2016 | Lin et al. | |
| 9,617,858 B2 | 4/2017 | Dambrine et al. | |
| 10,647,406 B2 * | 5/2020 | Deck | B64C 3/20 |
| 2010/0136293 A1 * | 6/2010 | Kubryk | B29D 99/0007 428/156 |
| 2012/0049000 A1 | 3/2012 | Kajita et al. | |
| 2012/0328819 A1 * | 12/2012 | Motohashi | B29D 99/0003 428/56 |
| 2013/0189482 A1 | 7/2013 | Dequine | |
| 2015/0099091 A1 | 4/2015 | Kurtz et al. | |

FOREIGN PATENT DOCUMENTS

| | | | |
|---|---|---|---|
| GB | 2168032 A | | 6/1986 |
| JP | 2009-178863 | * | 8/2009 |
| WO | 2018041992 A1 | | 3/2018 |

\* cited by examiner

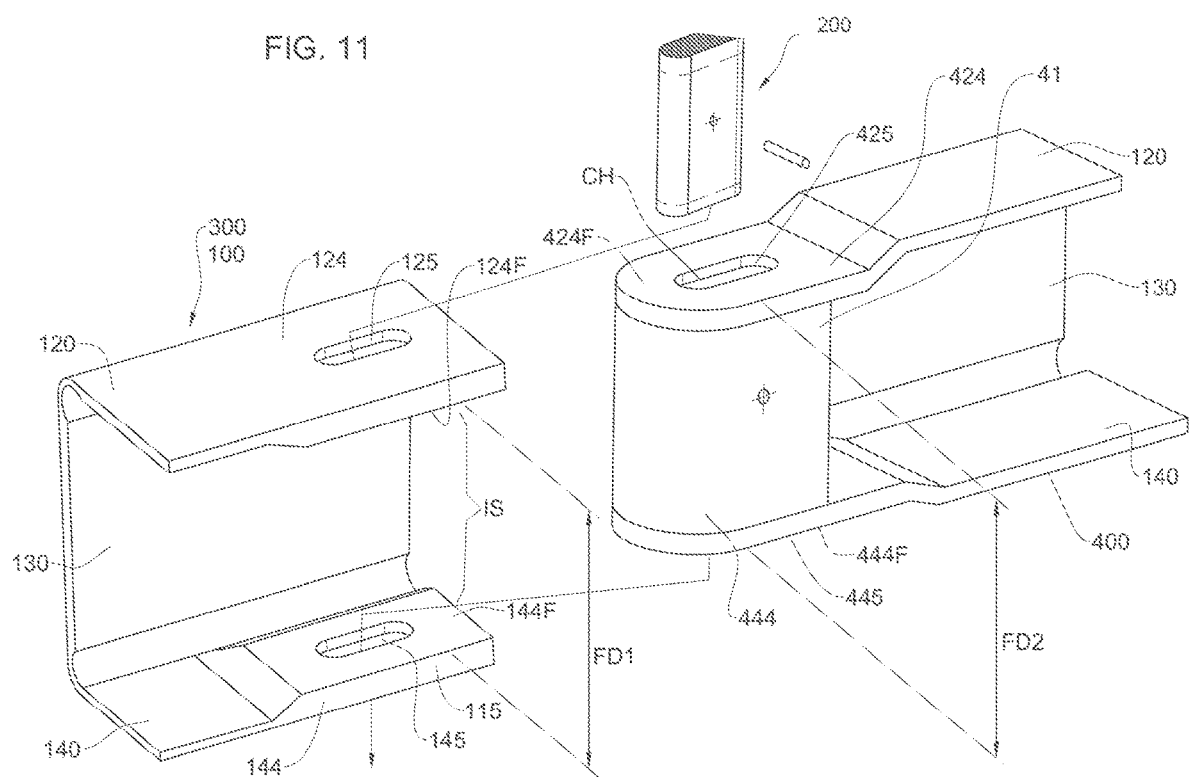

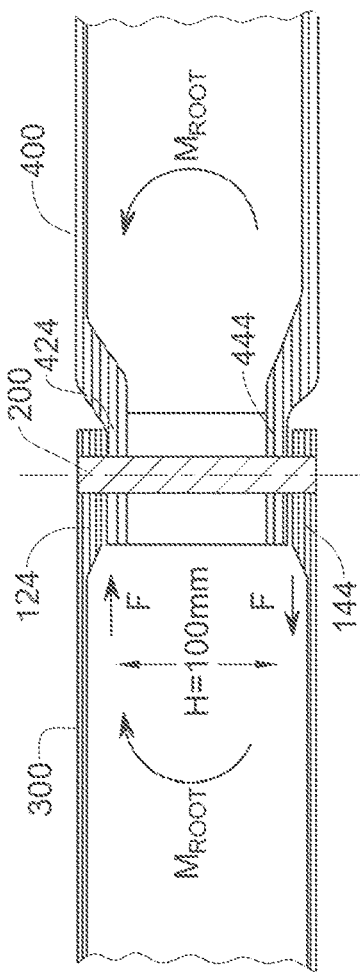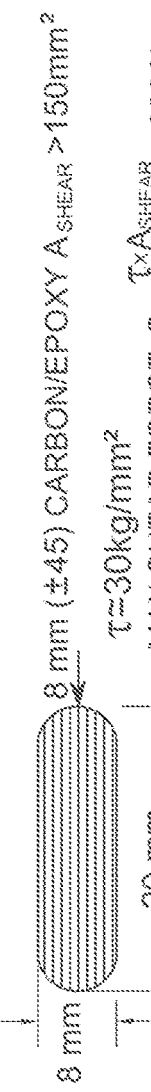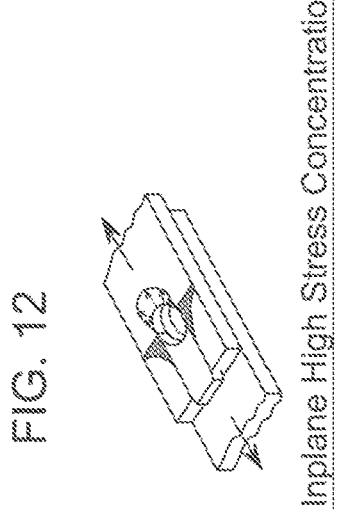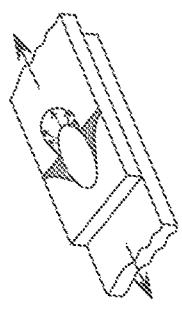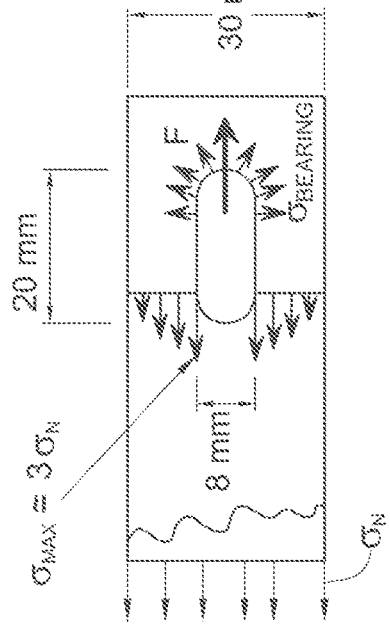
FIG. 12

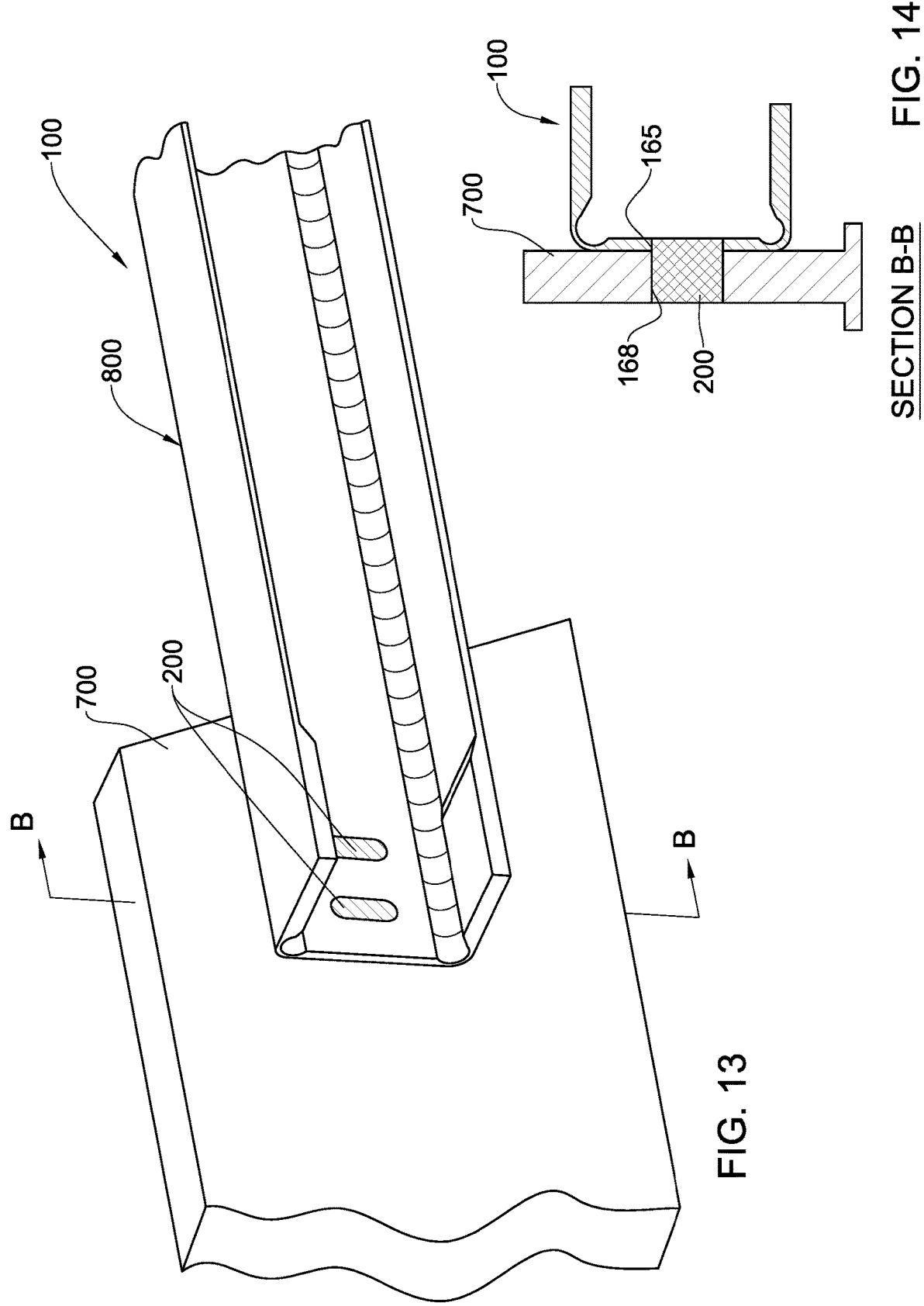

COMPOSITE STRUCTURAL ELEMENTS

TECHNOLOGICAL FIELD

The presently disclosed subject matter relates to composite structural elements, in particular for use in air vehicle structures and other structures.

BACKGROUND ART

References considered to be relevant as background to the presently disclosed subject matter are listed below:
U.S. Pat. No. 7,837,148 (EP 2032432)
U.S. Pat. No. 9,272,769
US 2012/0049000

Acknowledgement of the above references herein is not to be inferred as meaning that these are in any way relevant to the patentability of the presently disclosed subject matter.

BACKGROUND

There are a host of applications in which two load bearing members are required to be connected in load hearing contact. In at least some cases one or both of the load bearing members are made from non-metallic materials, for example composite materials, and metallic pins are often used for transmitting shear loads or bending loads between the connected non-metallic load bearing members.

By way of non-limiting example, U.S. Pat. No. 7,837,148 discloses embodiments of integral composite panels and joints for composite structures. In one implementation, an integrated panel spanning substantially the entire wingspan of an aircraft, includes at least a center portion and a pair of outwardly projecting wing portions. The portions may include a skin formed from successive layers or plies of composite material which overlap and offset at the joint between respective sections creating a pad-up area to carry loads between the portions. In a particular implementation, the skin is laid over one or more structural stringers which are transitioned into the joints between sections such as by tapering of the thickness and/or stiffness of the stringer.

Also by way of non-limiting example, US 2012/049000 discloses a first number of layers of a composite material for a wing, a second number of layers of the composite material for the wing, and a metal layer located between the first number of layers and the second number of layers in the wing. The metal layer has a first thickness at a first area configured to receive a number of fasteners and a second thickness at a second area.

Also by way of non-limiting example, U.S. Pat. No. 9,272,769 discloses a wing joint including a T-chord and a splice plate for connecting an inboard wing panel assembly and an outboard wing panel assembly. The wing panel assemblies include a stringer co-bonded or co-cured with a wing skin. The webbing and cap of the stringer may be trimmed to expose a noodle and base flange. The noodle and base flange interface with the bottom of the T-chord and the wing skin interfaces with the splice plate. The exposed noodle may be non-flush with the base flange of the trimmed stringer. The bottom of the T-chord may include a groove to accommodate a non-flush noodle so that a gap does not exist between the T-chord and the base flange. Alternatively, shims may be used to compensate for a non-flush noodle or the base flange and web may include sacrificial plies permitting the base flange and web to be trimmed flush with the noodle.

GENERAL DESCRIPTION

Herein "composite structural member" is used interchangeably with "composite structural element".

According to a first aspect of the presently disclosed subject matter there is provided a composite structural member comprising:

at least one first flange element made from a first composite material;

at least one first web element made from a second composite material;

said at least one first web element being connected to at least one said first flange element in a non-coplanar manner along a corresponding mutual first edge via a first corner element made from a third composite material, said mutual first edge extending along a first direction;

said third composite material comprising a corresponding first plurality of third composite material first fibers and a corresponding second plurality of third composite material second fibers embedded in a corresponding third composite material matrix in a non-parallel orientation with respect to said third composite material first fibers, wherein said third composite material first fibers are nominally orthogonal to said mutual first edge or to said first direction.

The composite structural member according to the first aspect of the presently disclosed subject matter can include one or more of the following features in any combination:

Wherein said first composite material comprises a corresponding first plurality of first composite material first fibers and a corresponding second plurality of first composite material second fibers embedded in a corresponding first composite material matrix in a non-parallel orientation with respect to said first composite material first fibers, wherein said first composite material first fibers are nominally orthogonal to said mutual first edge or to said first direction.

Wherein said second composite material comprises a corresponding first plurality of second composite material first fibers and a corresponding second plurality of second composite material second fibers embedded in a corresponding second composite material matrix in a non-parallel orientation with respect to said second composite material first fibers, wherein said second composite material first fibers are oriented nominally at 45° to said mutual first edge or to said first direction.

The composite structural member comprising an interface portion, wherein said first flange element at the interface portion comprises a first enlarged portion having a thickness greater than in other portions of the first flange element. For example comprising at least one first opening provided in said first enlarged portion; for example each said first opening having a length dimension greater than a width direction thereof.

Wherein said first corner element has a first thickness and a first internal radius, wherein said first internal radius is less than or equal to three times said first thickness, or wherein said first internal radius is less than or equal to twice times said first thickness, or wherein said first internal radius is less than or equal to said first thickness.

The composite structural member including one said web element connected to one said flange element in a non-coplanar manner along said corresponding mutual first edge to provide the composite structural element with an L-shaped transverse cross-section.

The composite structural member further comprising:
at least one second flange element made from a fourth composite material;
said at least one web element being connected to at least one said second flange element in a non-coplanar manner along a corresponding mutual second edge via a second corner element made from a fifth composite material, said mutual second edge extending along a second direction;
said fifth composite material comprising a corresponding first plurality of fifth composite material first fibers and a corresponding second plurality of fifth composite material second fibers embedded in a corresponding fifth composite material matrix in a non-parallel orientation with respect to said fifth composite material first fibers, wherein said fifth composite material first fibers are nominally orthogonal to said mutual second edge or to said second direction.
Wherein said fourth composite material comprises a corresponding first plurality of fourth composite material first fibers and a corresponding second plurality of fourth composite material second fibers embedded in a corresponding fourth composite material matrix in a non-parallel orientation with respect to said fourth composite material first fibers, wherein said fourth composite material first fibers are nominally orthogonal to said mutual second edge or to said second direction.
Wherein said second flange element at the interface portion comprises a second enlarged portion having a corresponding thickness greater than in other portions of the second flange element. For example comprising at least one second opening provided in said second enlarged portion. For example each said second opening having a length dimension greater than a width direction thereof.
Wherein said second corner element has a second thickness and a second internal radius, wherein said second internal radius is less than or equal to three times said second thickness, or wherein said second internal radius is less than or equal to twice times said second thickness, or wherein said second internal radius is less than or equal to said second thickness.
The composite structural member including one said web element connected to one said flange element in a non-coplanar manner along said corresponding mutual first edge, and wherein said web element is connected to one said second flange element in a non-coplanar manner along said corresponding mutual second edge to provide the composite structural element with a C-shaped transverse cross-section.
The composite structural member comprising at least one third opening provided in said web element. For example, each said third opening having a length dimension greater than a width direction thereof.
According to a second aspect of the presently disclosed subject matter there is provided a composite structural member, having a length dimension, width dimension and depth dimension, and comprising:
a laminate structure comprising a plurality of layers made from a first composite material,
each said layer comprising at least a first plurality of first fibers and a second plurality of second fibers embedded in a matrix, said layers being orthogonal to the width dimension;
and wherein said length dimension is greater than said width dimension.

The composite structural member according to the first aspect of the presently disclosed subject matter can include one or more of the following features in any combination:
Wherein for at least one said layer the corresponding said second fibers are in a non-parallel orientation with respect to the corresponding said first fibers, wherein said first fibers are oriented nominally at 45° to said depth dimension.
The composite structural member having a transverse cross-section orthogonal to said depth dimension.
Wherein said transverse cross-section is uniform along said depth dimension.
Wherein said transverse cross-section includes two rounded ends spaced by said length direction.
Wherein said transverse cross-section is elliptical or super elliptical.
Wherein said rounded ends are joined together by edge portions.
Wherein said edge portions are rectilinear.
According to a third aspect of the presently disclosed subject matter there is provided a structural system comprising:
a first structural support element;
a second support element;
at least one composite structural member for mechanically connecting said first structural support element with respect to said second structural support element in a load bearing manner, wherein said composite structural member is as defined herein according to the second aspect of the presently disclosed subject matter.
According to a fourth aspect of the presently disclosed subject matter there is provided a method for mechanically connecting a first structural support element with respect to a second structural support element in a load bearing manner, using a composite structural member is as defined herein according to the second aspect of the presently disclosed subject matter.
A feature of at least one example according to one or more of the above aspects of the presently disclosed subject matter is that several non-metallic load carrying members, for example made from composite materials, can be connected in a load-bearing manner, using non-metallic connecting members, for example using a composite structural member as defined herein according to the second aspect of the presently disclosed subject matter. Another feature of at least one example according to one or more of the above aspects of the presently disclosed subject matter is that an air vehicle, for example, a UAV, can be provided in which the fuselage and/or wings can be made from non-metallic materials, for example composite materials, to the exclusion of metallic load bearing elements and/or metallic connectors.
Another feature of at least one example according to one or more of the above aspects of the presently disclosed subject matter is that an air vehicle, for example, a UAV, can be provided in which risk of corrosion is significantly reduced or eliminated, as compared with similar air vehicles or UAV that include metallic load bearing components.
Another feature of at least one example according to one or more of the above aspects of the presently disclosed subject matter is that an air vehicle, for example, a UAV, can be provided in which the capital costs and/or running costs can be significantly reduced, as compared with similar air vehicles or UAV that include metallic load bearing components.
Another feature of at least one example according to one or more of the above aspects of the presently disclosed subject matter is that an air vehicle, for example, a UAV, can be provided that is particularly suited for withstanding exposure to a maritime environment.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which:

FIG. 11 illustrates in isometric view a first example of use of the example of FIG. 10 in connecting two structural support elements in a load bearing manner.

FIG. 12 provides a number of calculations regarding predicted stresses and other mechanical parameters regarding the example of FIG. 11.

FIG. 13 illustrates in isometric view a second example of use of the example of FIG. 10 in connecting two structural support elements in a load bearing manner.

FIG. 14 illustrates a transverse cross-section of the example of FIG. 13 taken along section B-B.

DETAILED DESCRIPTION

Figure 1:
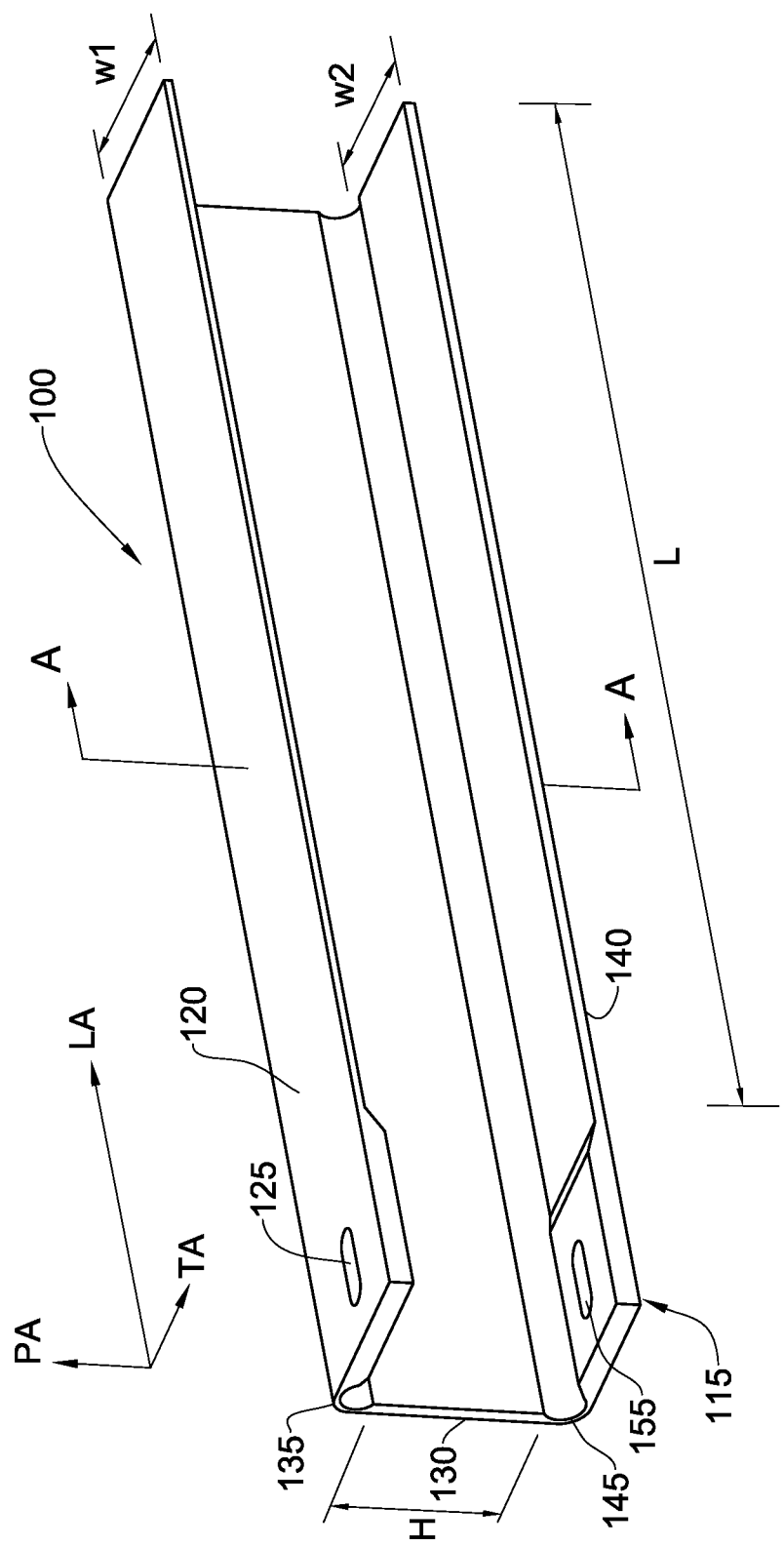
FIG. 1 illustrates in isometric view a first example of a composite structural member according to a first aspect of the presently disclosed subject matter.
Figure 2:
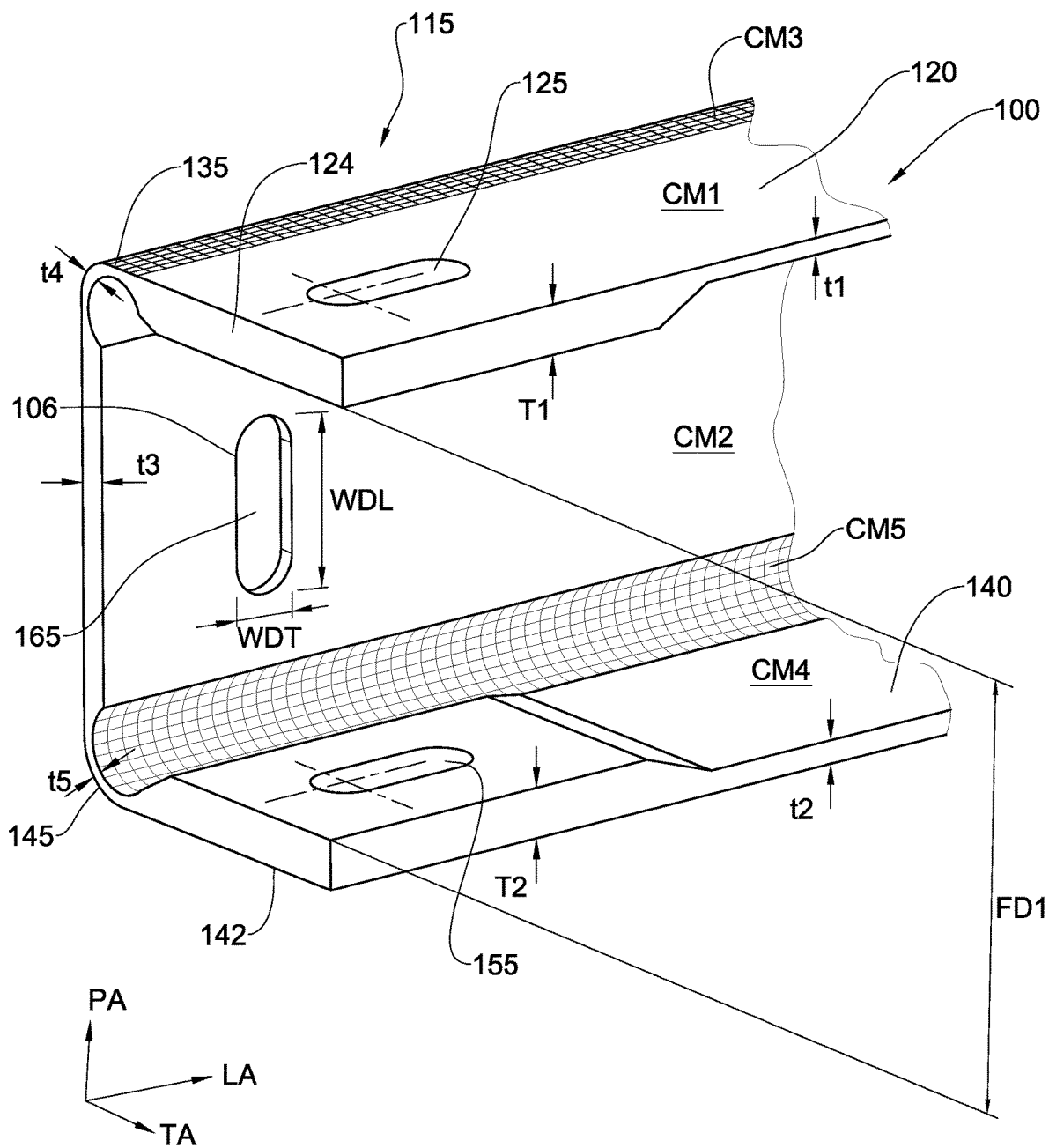
FIG. 2 illustrates in isometric view a longitudinal end of the example of FIG. 1 including an interface portion thereof.

Referring to FIG. 1 and FIG. 2, a first example of a composite structural member, according to a first aspect of the presently disclosed subject matter, is generally designated 100 and is in the form of a structural support beam. For example, such a structural support beam can be configured as a spar for a wing, for example for use in a UAV.

Figure 1A:
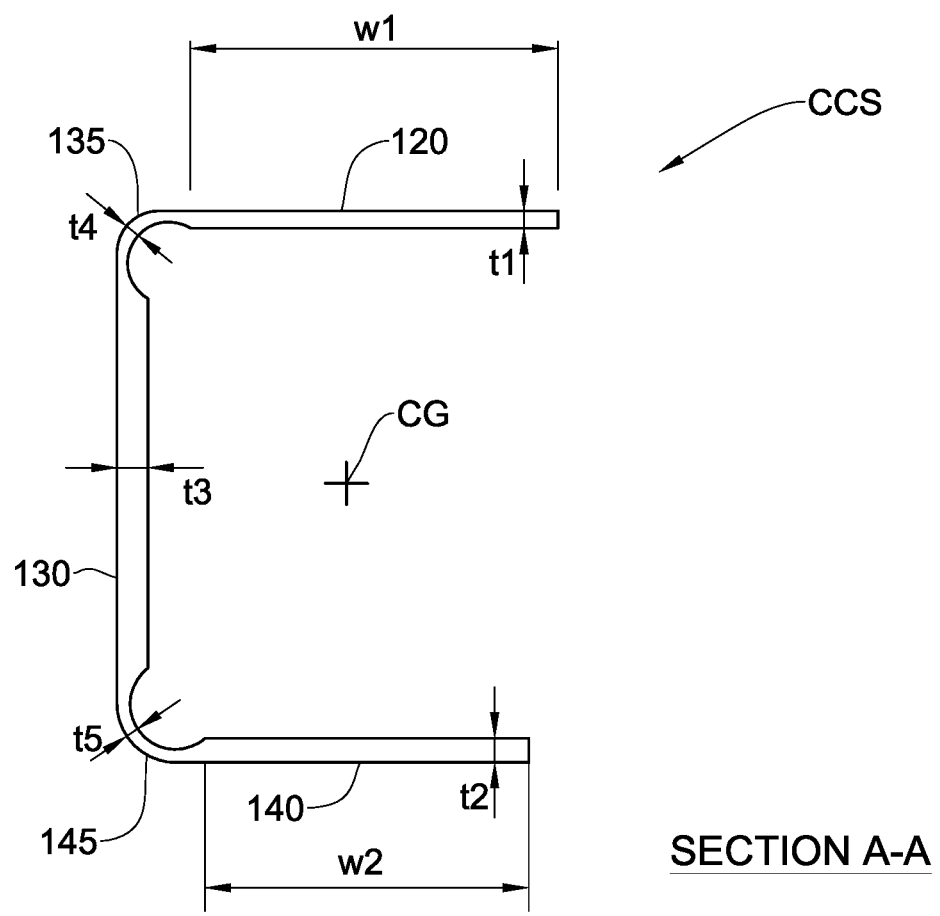
FIG. 1(a) illustrates a transverse cross-section of the example of FIG. 1 taken along section A-A.

In this example, and referring also to FIG. 1(a), the composite structural member 100 is elongate and has a C-shaped transverse cross-section CCS. The structural member 100 comprises a first flange element 120, a second flange element 140, and a web element 130. The web element 130 is connected to the first flange element 120 and to the second flange element 140 via first corner element 135 and second corner element 145, respectively, thereby providing the aforesaid C-shaped transverse cross-section CCS.

The C-shaped transverse cross-section CCS has a geometric center CG.

In this example, the composite structural member 100 is essentially rectilinear and extends along longitudinal axis LA; thus, the locus of the geometric center CG is thus also rectilinear and parallel to or coaxial with the longitudinal axis LA.

In alternative variations of this and other examples, the composite structural member 100 is non-rectilinear, for example curvuate, and extends along a curved axis; thus, the corresponding locus of the geometric center CG is thus also non-rectilinear, for example along a curved line corresponding to the curved axis.

In this example, and referring to FIGS. 1 and 1(a), the first flange element 120 extends along the longitudinal axis LA, and has a width W1 along a transverse axis TA, orthogonal to the longitudinal axis LA; the second flange element 140 extends along the longitudinal axis LA, and has a width W2 along a transverse axis TA, orthogonal to the longitudinal axis LA; the web element 130 extends along the longitudinal axis LA, and has a height H along a peg axis PA, orthogonal to the longitudinal axis LA and to the transverse axis TA.

The web element 130 is connected to the first flange element 120 in a non-coplanar manner along a corresponding mutual edge via the first corner element 135, this mutual edge extending along a direction parallel to the longitudinal axis. While in this example, web element 130 is connected to the first flange element 120 in an orthogonal manner, in alternative variations of this example the web element 130 can be connected to the first flange element 120 at any suitable non-zero angular orientation.

The web element 130 is connected to the second flange element 140 in a non-coplanar manner along a corresponding mutual edge via the second corner element 145, this mutual edge extending along a direction parallel to the longitudinal axis. While in this example, web element 130 is connected to the second flange element 140 in an orthogonal manner, in alternative variations of this example the web element 130 can be connected to the second flange element 140 at any suitable non-zero angular orientation.

In this the first corner element 135 and second corner element 145 are each co-extensive with the longitudinal axis LA.

In this example, and referring in particular to FIG. 1(a), the first flange element 120 has a thickness t1, the second flange element 140 has a thickness t2, the web element 130 has a thickness t3, the first corner element 135 has a thickness t4, and the second corner element 145 has a thickness t5.

In this example, thickness t1 of the first flange element 120 is equal to the thickness t2 of the second flange element 140. However, in alternative variations of this example, thickness t1 is greater than thickness t2, or, thickness t1 is less than thickness t2.

In this example, the thickness t3 of the web element 130 is equal to the thickness t1 of the first flange element 120 or to the thickness t2 of the second flange element 140. However, in the above or other alternative variations of this example, thickness t3 is greater than thickness t1 or thickness t2, or, thickness t3 is greater than thickness t1 but less than thickness t2, or, thickness t3 is greater than thickness t2 but less than thickness t2, or, thickness t3 is less than thickness t1 or thickness t2.

In this example, thickness t4 of the first corner element 135 is equal to the thickness t5 of the second corner element 145. However, in the above or other alternative variations of this example, thickness t4 is greater than thickness t5, or, thickness t4 is less than thickness t5.

In this example, the thickness t3 of the web element 130 is greater than the thickness t4 of the first corner element 135 or the thickness t5 of the second corner element 145. However, in the above or other alternative variations of this example, thickness t3 is equal to thickness t4 or thickness t5, or, thickness t3 is greater than thickness t4 but less than thickness t5, or, thickness t3 is greater than thickness t5 but less than thickness t4, or, thickness t3 is less than thickness t4 or thickness t5.

In this example, the thickness t1 of the first flange element 120 is greater than the thickness t4 of the first corner element 135 or the thickness t5 of the second corner element 145. However, in the above or other alternative variations of this example, thickness t1 is equal to thickness t4 or thickness t5, or, thickness t1 is greater than thickness t4 but less than thickness t5, or, thickness t1 is greater than thickness t5 but less than thickness t4, or, thickness t1 is less than thickness t4 or thickness t5.

In this example, thickness t4 of the first corner element 135 and the thickness t5 of the second corner element 145 are each less than the thickness t1 or thickness t2 or thickness t3.

In this example, the thickness t2 of the second flange element 140 is greater than the thickness t4 of the first corner element 135 or the thickness t5 of the second corner element 145. However, in the above or other alternative variations of this example, thickness t2 is equal to thickness t4 or thickness t5, or, thickness t2 is greater than thickness t4 but less than thickness t5, or, thickness t2 is greater than thickness t5 but less than thickness t4, or, thickness t2 is less than thickness t4 or thickness t5.

In this example, thickness t1, thickness t2, thickness t3, thickness t4, thickness t5 remain nominally uniform, along the longitudinal length L of the composite structural member 100 up to an interface portion 115 of the composite structural member 100 at one longitudinal end thereof. As will become clearer here, the interface portion 115 is configured for connection to a desired structure. However, in alternative variations of this example, thickness t1, thickness t2, thickness t3, thickness t4, thickness t5 remain nominally uniform, along the entire longitudinal length L of the composite structural member 100, and also including the interface portion 115 of the composite structural member 100 at one longitudinal end thereof in examples that include such an interface portion.

Figure 4A:
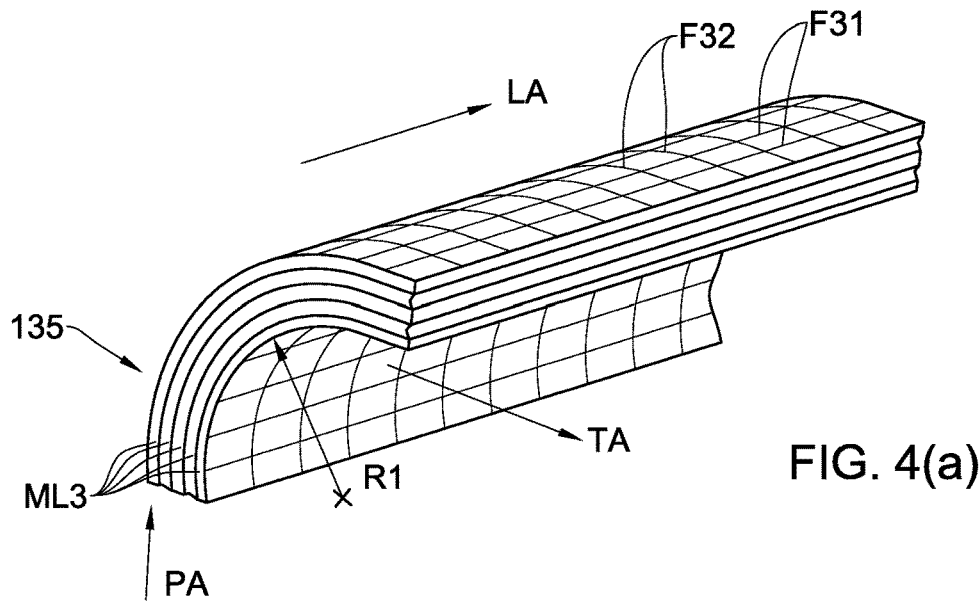
FIG. 4(a) illustrates in partial isometric view, a first corner element of the example of FIG. 1.
Figure 5A:
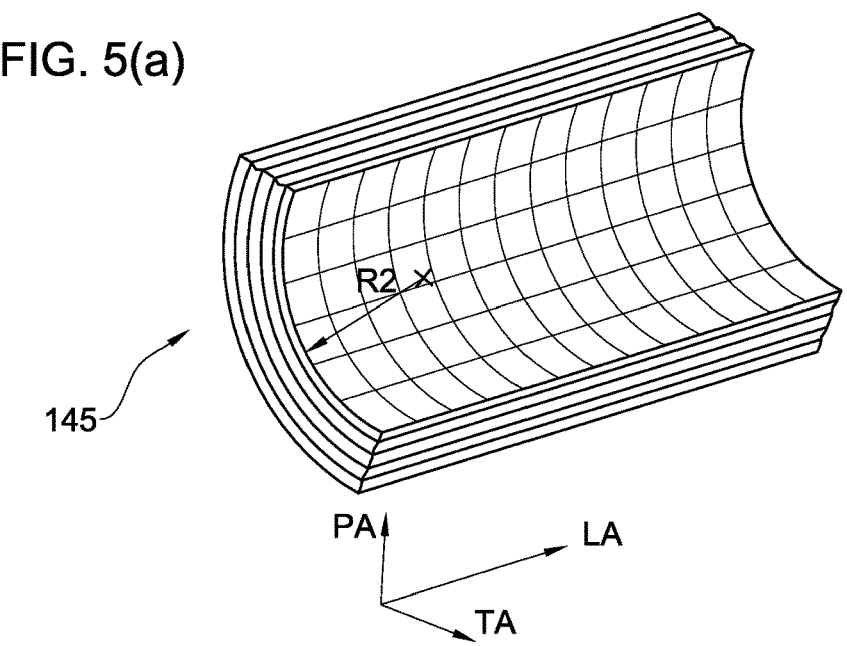
FIG. 5(a) illustrates in partial isometric view, a second corner element of the example of FIG. 1.

In this and other examples, and referring in particular to FIG. 4(a) and FIG. 5(a), the first corner element 135 and second corner element 145 are provided with respective internal radii R1, R2 that are relatively small.

For example, radius R1 is about the same magnitude as the respective thickness t4 of the first corner element 135, but can be up to 2 or 3 times thickness t4. Thus radius R1 can be in the range t4 to 2*t4, or in the range t4 to 3*t4.

For example, radius R2 is about the same magnitude as the respective thickness t5 of the second corner element 145, but can be for example up to 2 or 3 times thickness t5. Thus radius R2 can be in the range t5 to 245, or in the range t5 to 345, for example.

In this example, the interface portion 115 also has a C-shaped transverse cross-section, similar to C-shaped transverse cross-section CCS, and in which the first flange element 120 comprises a first flange enlarged portion 122 having a thickness T1 that is greater than thickness t1, and in which the second flange element 140 comprises a second flange enlarged portion 142 having a thickness T2 that is greater than thickness t2.

In this example, the first flange enlarged portion 122 has a first opening 125 through the thickness T1 thereof, and the second flange enlarged portion 142 has a second opening 145 through the thickness T4 thereof. In this example, the first opening 125 and the second opening 145 are in registry, and thus co-aligned about a peg axis PA. In this example, the peg axis PA is orthogonal to the longitudinal axis LA and transverse axis TA. However, in alternative variations of this example, only one or the other of the first flange enlarged portion 122 or the second flange enlarged portion 142 has the respective first opening 125 or second opening 155, or, the first opening 125 and the second opening 155 are not in registry, i.e., not co-aligned about any axis.

Figure 3:
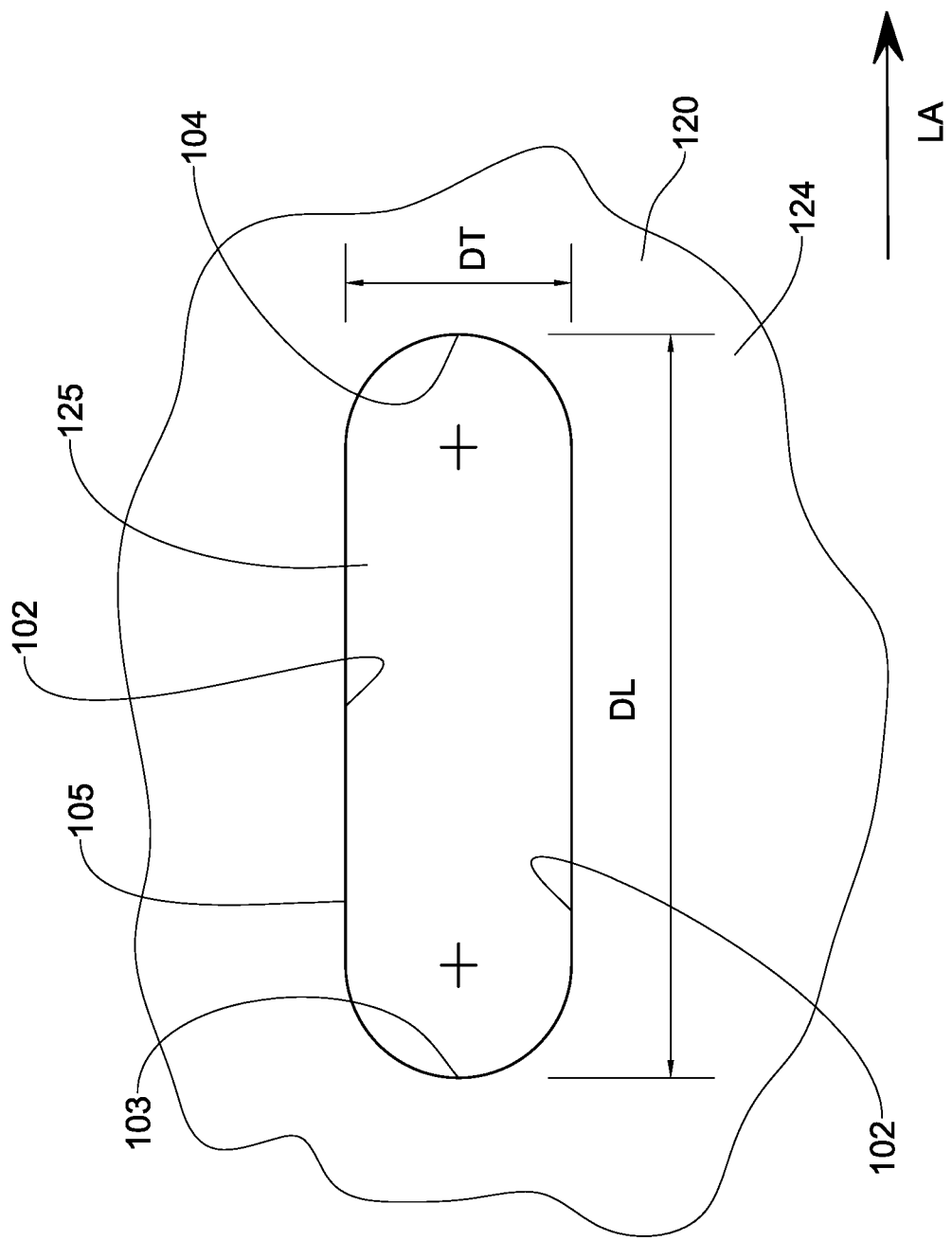
FIG. 3 illustrates in partial top view the longitudinal end of the example of FIG. 1.

Referring to FIG. 3, and as will become clearer below, especially in the context of the second aspect of the presently disclosed subject matter, each one of the first opening 125 and the second opening 155 is formed having an opening profile 105 having longitudinal dimension DL along the longitudinal axis LA that is greater than its transverse dimension DT. The opening profile 105 includes rounded end walls 103, 104, for example formed as half-cylindrical walls, spaced by flat side walls 102. In this example the opening profile 105 is uniform in size and shape along the depth of the respective thickness T1 or T2. In alternative variations of this example, the opening profile 105 is non-uniform in size and/or in shape along the depth of the respective thickness T1 or T2—for example the opening profile 105 has a uniform shape but a diminishing size along the depth of the respective thickness T1 or T2 towards the geometrical center CG.

In alternative variations of this example, the opening profile 105 can have any other suitable shape, for example elliptical or super elliptical, in which the respective major axis is along the longitudinal axis LA.

In these and other examples, the opening profile 105 has its longer dimension (the longitudinal dimension DL) in the direction in which loads are to be transmitted via the respective first opening 125 and the second opening 155. Such loads, as will become clearer herein, can include shear loads generally aligned with the longitudinal axis LA.

Referring again to FIG. 2, the structural member 100 can have at least one web opening 165 through the thickness t3 thereof (for example two or more web openings 165, for example spaced along the longitudinal axis PA), in addition to or instead of the first opening 125 and/or the second opening 155. Each web opening 165 can be similar to the first opening 125 and/or the second opening 155, mutatis mutandis.

Thus, the web opening 165 is formed having an opening profile 106, similar to opening profile 105, mutatis mutandis. Opening profile 106 has a longitudinal dimension WDL along the peg axis PA that is greater than its transverse dimension WDT. The opening profile 106 includes rounded end walls, for example formed as half-cylindrical walls, spaced by flat side walls. In this example the opening profile 106 is uniform in size and shape along the depth of the web thickness t3. In alternative variations of this example, the opening profile 106 is non-uniform in size and/or in shape along the depth of the web thickness t3—for example the opening profile 106 has a uniform shape but a diminishing size along the depth of the web thickness t3 towards or away from the geometrical center CG.

In this and other examples, the opening profile 106 has its longer dimension (the longitudinal dimension WDL) in the direction in which loads are to be transmitted via the respective web opening 165. Such loads, as will become clearer herein, can include shear loads generally aligned with the peg axis PA.

The first flange element 120 is made from a first composite material CM1, the web element 130 is made from a second composite material CM2, and the first corner element 135 is made from a third composite material CM3.

Similarly, the second flange element 140 is made from a fourth composite material CM4, and the second corner element 145 is made from a fifth composite material CM5.

Figure 4B:
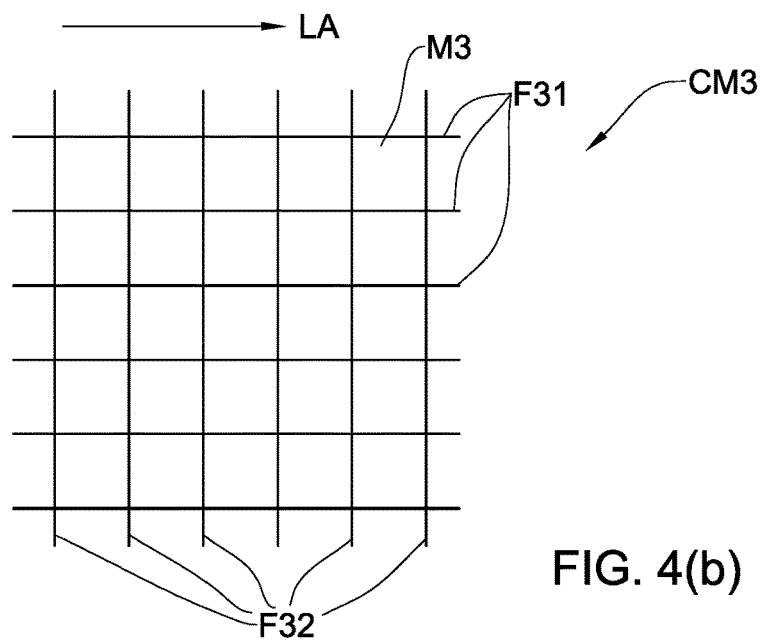
FIG. 4(b) schematically illustrates an arrangement of the fibers in the composites materials used for the first corner element of the example of FIG. 4(a)
Figure 4C:
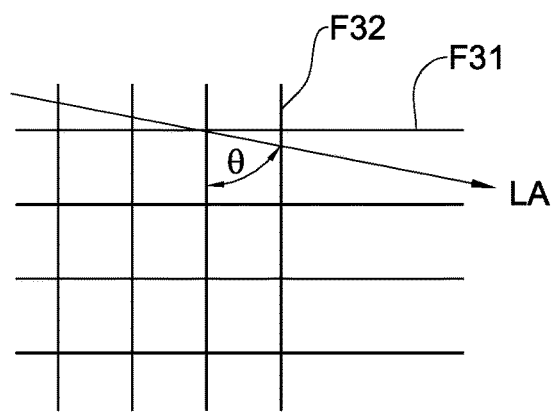
FIG. 4(c) schematically illustrates an angular relationship of the fibers in the arrangement of the example of FIG. 4(b) with respect to a longitudinal axis of the example of FIG. 1.

Referring to FIGS. 4(*a*) and 4(*b*), in this example, the third composite material CM3 is made from a first plurality of first fibers F31 and a second plurality of second fibers F32 embedded in a matrix M3, the second fibers F32 being in a non-parallel orientation with respect to the first fibers F31. For example, such a matrix can be a curable material such as for example epoxy resin, or any other suitable resinous matrix, thermoplastic resin or other thermoset resin. For example, the first fibers F31 and/or the second fibers F32 are carbon fibers or graphite fibers.

In this example, and referring in particular to FIG. 4(*c*), in the first corner element 135 the second fibers F32 are oriented in a direction nominally orthogonal with respect to the longitudinal axis LA. In other words, the second fibers F32 are oriented orthogonal with respect to the longitudinal axis LA, or can be aligned at an angle θ to the longitudinal axis LA. In this example, angle θ is in the range 90° to 90°±3°. In alternative variations of this example angle θ can be in the range of 90° to any one of: 90°±5°; 90°±10°; 90°±15°.

In at least this example, and referring in particular to FIG. 4(*a*), the first fibers F31 are oriented orthogonally with respect to the second fibers F32. Thus, parts of or some of the second fibers F32 are oriented nominally parallel to the transverse axis TA, and parts of or some of the second fibers F32 are oriented nominally parallel to the peg axis PA. In alternative variations of this example, the first fibers F31 are oriented at any suitable non-zero orientation with respect to the second fibers F32.

It is to be noted that the first corner element 135 can be formed as a multilayer fiber reinforced manner, in which multiple layers ML3 are laminated together, each such layer comprising the first fibers F31 and the second fibers F32 embedded in the matrix M3 and in the desired orientation with respect to the longitudinal axis LA.

Without being bound to theory, the inventors consider that by providing the above arrangement of the first fibers F31 and/or the second fibers F32, embedded in the matrix, in particular the second fibers F32 being nominally orthogonal to the longitudinal axis LA, and also providing a relatively small corner radius R1, renders the first corner element 135 less stiff and increases the ability of the first corner element 135 to resist shear loads, as compared with having the fibers oriented at relatively large acute angles, for example 40° or 45°, to the longitudinal axis LA, and correspondingly reduces the risk of the web element 130 tearing from the first flange element 120 responsive to large loads being applied to the composite structural member 100.

The second corner element 145 can have a similar structure to that disclosed herein for the first corner element 135, mutatis mutandis. For example, the fifth composite material CM5 can be similar to or identical with the third composite material CM3, mutatis mutandis.

Figure 5B:
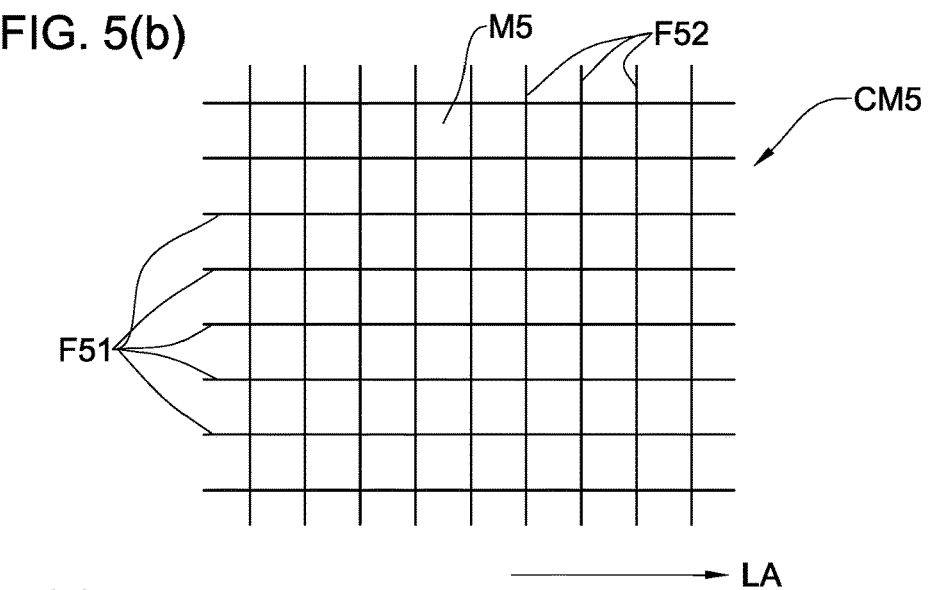
FIG. 5(b) schematically illustrates an arrangement of the fibers in the composites materials used for the first corner element of the example of FIG. 5(a)
Figure 5C:
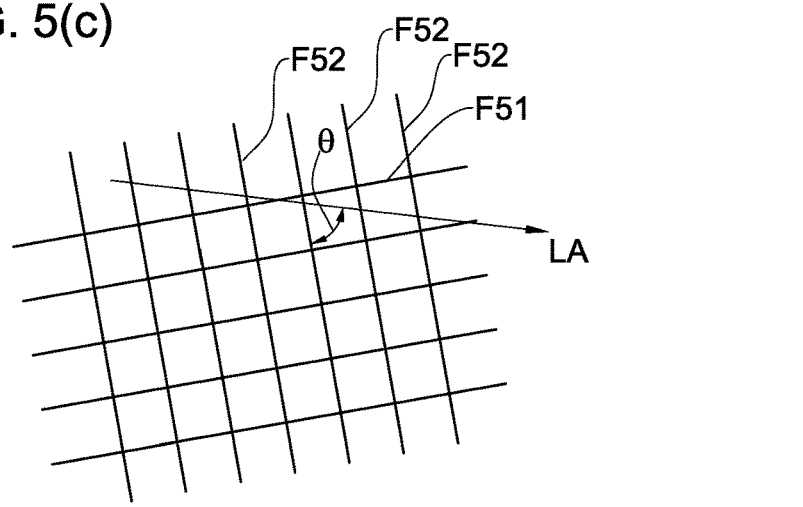
FIG. 5(c) schematically illustrates an angular relationship of the fibers in the arrangement of the example of FIG. 5(b) with respect to a longitudinal axis of the example of FIG. 1.

Thus, and referring to FIGS. 5(*a*) and 5(*b*), in this example, the fifth composite material CM5 is made from a corresponding first plurality of corresponding first fibers F51 and a corresponding second plurality of corresponding second fibers F52 embedded in a matrix M5, the second fibers F52 being in a non-parallel orientation with respect to the first fibers F51. The first fibers F51, the second fibers F52 and the matrix M5 can be for example similar to as disclosed herein regarding the third composite material CM3, in particular the first fibers F31, second fibers F32, and matrix M3, mutatis mutandis. Thus, for example, such a matrix M5 for the fifth composite material CM5 can be a curable material such as for example epoxy resin, or any other suitable resinous matrix, thermoplastic resin or other thermoset resin, and for example, the first fibers F51 and/or the second fibers F52 are carbon fibers or graphite fibers.

In this example, and referring also to FIG. 5(*c*), in the second corner element 145 the corresponding second fibers F52 are oriented in a direction nominally orthogonal with respect to the longitudinal axis LA. In other words, the corresponding second fibers F52 are oriented orthogonal with respect to the longitudinal axis LA, or can be aligned at an angle θ to the longitudinal axis LA. In this example, angle θ is in the range 90° to 90°±3°. In alternative variations of this example angle θ can be in the range of 90° to any one of: 90°±5°; 90°±10°; 90°±15°.

In at least this example, the corresponding first fibers F51 are oriented orthogonally with respect to the corresponding second fibers F52. Thus, parts of or some of the corresponding second fibers F52 are oriented nominally parallel to the transverse axis TA, and parts of or some of the corresponding second fibers F52 are oriented nominally parallel to the peg axis PA. In alternative variations of this example, the first fibers F51 are oriented at any suitable non-zero orientation with respect to the second fibers F52.

It is to be noted that the second corner element 145 can be formed as a multilayer fiber reinforced manner, in which multiple layers are laminated together, each such layer comprising corresponding first fibers F51 and corresponding second fibers F52 in the desired orientation with respect to the longitudinal axis LA.

Also without being bound to theory, the inventors consider that by providing the above arrangement of the corresponding first fibers F51 and/or the second fibers F52, embedded in the matrix M5, in particular the second fibers F52 being nominally orthogonal to the longitudinal axis LA, and also providing a relatively small corner radius R2, renders the second corner element 145 less stiff and increases the ability of the second corner element 145 to resist shear loads, as compared with having the fibers oriented at relatively large acute angles, for example 40° or 45°, to the longitudinal axis LA, and correspondingly reduces the risk of the web element 130 tearing from the second flange element 140 responsive to large loads being applied to the composite structural member 100.

Figure 6:
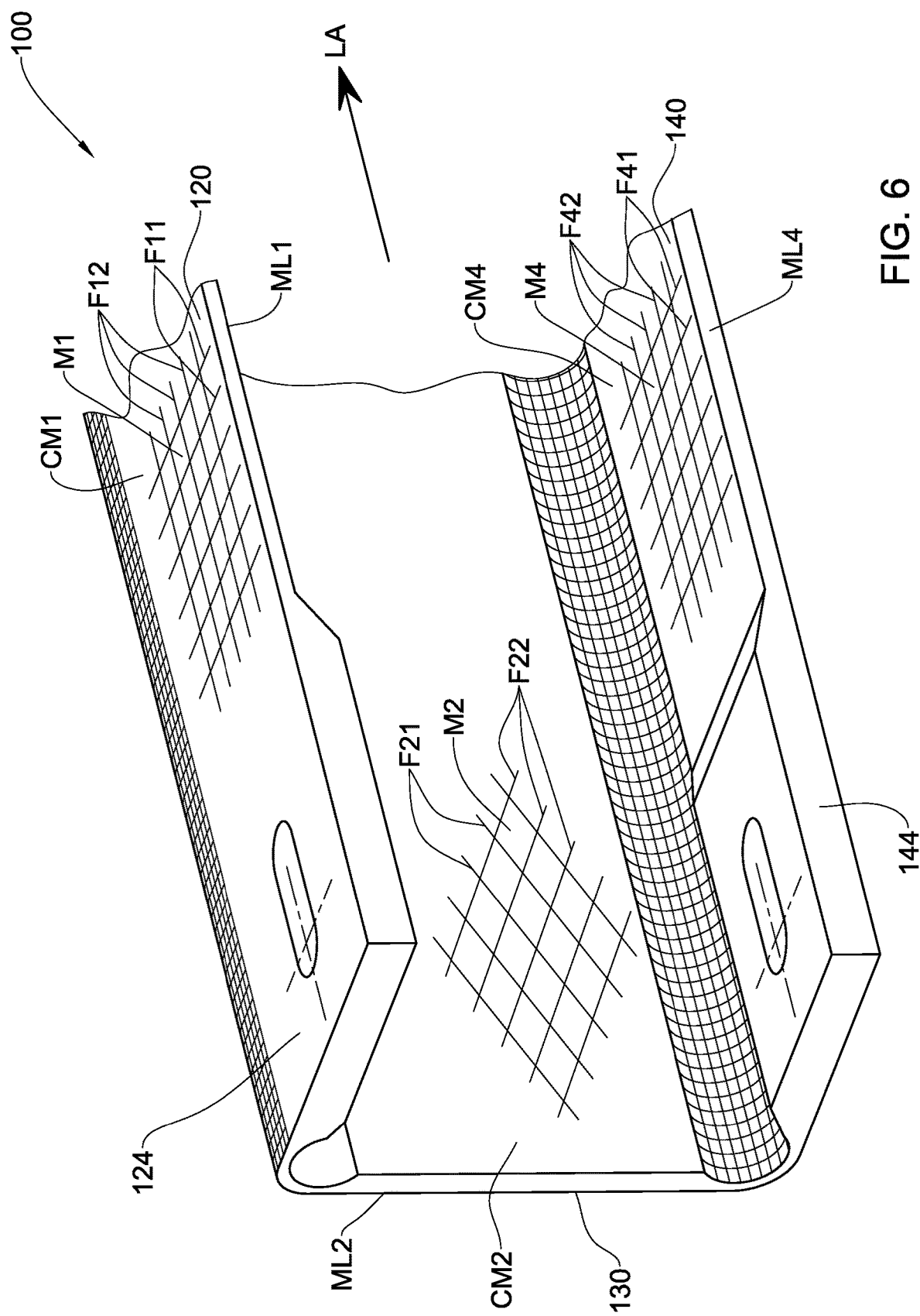
FIG. 6 illustrates in partial isometric view the example of FIG. 1 and schematically illustrates an arrangement of the fibers in the composites materials used for the first flange element, the web element, and the second flange element thereof.

Referring to FIG. 6, in this example, the first composite material CM1 is made from a corresponding first plurality of corresponding first fibers F11 and a corresponding second plurality of corresponding second fibers F12 embedded in a matrix M1, the second fibers F12 being in a non-parallel orientation with respect to the first fibers F11. The first fibers F11, the second fibers F12 and the matrix M1 can be for example similar to as disclosed herein regarding the third composite material CM3, in particular the first fibers F31, second fibers F32, and matrix M3, mutatis mutandis. Thus, for example, such a matrix M1 for the first composite material CM1 can be a curable material such as for example epoxy resin, or any other suitable resinous matrix, thermoplastic resin or other thermoset resin, and for example, the corresponding first fibers F11 and/or the corresponding second fibers F12 are carbon fibers or graphite fibers.

In this example, in the first flange element 120 the corresponding first fibers F11 are orthogonal to the corresponding second fibers F21, and are oriented in a direction nominally 90° with respect to the longitudinal axis LA. In alternative variations of this and other examples, the corresponding first fibers F11 and the corresponding second fibers F12 can have a different orientation to one another and/or to the longitudinal axis LA.

It is to be noted that the first flange element 120 can be formed as a multilayer fiber reinforced manner, in which multiple layers ML1 are laminated together, each such layer comprising the corresponding first fibers F11 and the corresponding second fibers F12 in the desired orientation with respect to the longitudinal axis LA.

Optionally, some of the layers ML1 can have the orientations of the corresponding first fibers F11 and the corresponding second fibers F12 arranged in a similar manner to the corresponding first fibers F31 and the corresponding second fibers F32 of the first corner element 135, and thus at least some of the layers ML1 can be contiguous or continuous with corresponding layers ML3.

It is to be noted that the first flange enlarged portion 122 is formed by providing additional layers ML1 up to thickness T1. It is also to be noted that at least in this example, the corresponding first fibers F11 of one or more of these additional layers are orthogonal to the corresponding second fibers F21, and are oriented in a direction nominally 45° with respect to the longitudinal axis LA. In alternative variations of this and other examples, the corresponding first fibers F11 and the corresponding second fibers F12 of these additional layers can have a different orientation to one another and/or to the longitudinal axis LA. In at least some examples, the first composite material CM1 in the first flange enlarged portion 122 can be quasi isotropic.

Referring again to FIG. 6, in this example, the second composite material CM2 is made from a corresponding first plurality of corresponding first fibers F21 and a corresponding second plurality of corresponding second fibers F22 embedded in a matrix M2, the second fibers F22 being in a non-parallel orientation with respect to the first fibers F21. The first fibers F21, the second fibers F22 and the matrix M2 can be for example similar to as disclosed herein regarding the third composite material CM3, in particular the first fibers F31, second fibers F32, and matrix, mutatis mutandis. Thus, for example, such a matrix M2 for the second composite material CM2 can be a curable material such as for example epoxy resin, or any other suitable resinous matrix, thermoplastic resin or thermoset resin, and for example, the corresponding first fibers F21 and/or the corresponding second fibers F22 are carbon fibers or graphite fibers.

In this example, in the web element 130 the corresponding first fibers F21 are orthogonal to the corresponding second fibers F22, and are oriented in a direction nominally 45° with respect to the longitudinal axis LA. In alternative variations of this and other examples, the corresponding first fibers F21 and the corresponding second fibers F22 can have a different orientation to one another and/or to the longitudinal axis LA.

It is to be noted that the web element 130 can be formed as a multilayer fiber reinforced manner, in which multiple layers ML2 are laminated together, each such layer comprising the corresponding first fibers F21 and the corresponding second fibers F22 in the desired orientation with respect to the longitudinal axis LA.

Optionally, some of the layers ML2 of the web element 130 can have the orientations of the corresponding first fibers F21 and the corresponding second fibers F22 arranged in a similar manner to the corresponding first fibers F31 and the corresponding second fibers F32 of the first corner element 135, and/or to the corresponding first fibers F51 and the corresponding second fibers F52 of the second corner element 145, and thus at least some of the layers ML2 can be contiguous or continuous with corresponding layers ML3 and/or with corresponding layers ML5.

Referring again to FIG. 6, in this example, the fourth composite material CM4 is made from a corresponding first plurality of corresponding first fibers F41 and a corresponding second plurality of corresponding second fibers F42 embedded in a matrix M4, the second fibers F42 being in a non-parallel orientation with respect to the first fibers F41. The first fibers F41, the second fibers F42 and the matrix M4 can be for example similar to as disclosed herein regarding the third composite material CM3, in particular the first fibers F31, second fibers F32, and matrix, mutatis mutandis. Thus, for example, such a matrix M4 for the fourth composite material CM4 can be a curable material such as for example epoxy resin, or any other suitable resinous matrix, thermoplastic resin or thermoset resin, and for example, the corresponding first fibers F41 and/or the corresponding second fibers F42 are carbon fibers or graphite fibers.

In this example, in the second flange element 140 the corresponding first fibers F41 are orthogonal to the corresponding second fibers, and are oriented in a direction nominally 90° with respect to the longitudinal axis LA. In alternative variations of this and other examples, the corresponding first fibers F41 and the corresponding second fibers F42 can have a different orientation to one another and/or to the longitudinal axis LA.

It is to be noted that the second flange element 140 can be formed as a multilayer fiber reinforced manner, in which multiple layers ML4 are laminated together, each such layer comprising the corresponding first fibers F41 and the corresponding second fibers F42 in the desired orientation with respect to the longitudinal axis LA.

Optionally, some of the layers ML4 can have the orientations of the corresponding first fibers F41 and the corresponding second fibers F42 arranged in a similar manner to the corresponding first fibers F51 and the corresponding second fibers F52 of the second corner element 145, and thus at least some of the layers ML4 can be contiguous or continuous with corresponding layers ML5.

It is to be noted that the second flange enlarged portion 142 is formed by providing additional layers ML4 up to thickness T2. It is also to be noted that at least in this example, the corresponding first fibers F41 of one or more of these additional layers are orthogonal to the corresponding second fibers F41, and are oriented in a direction nominally 45° with respect to the longitudinal axis LA. In alternative variations of this and other examples, the corresponding first fibers F41 and the corresponding second fibers F42 of these additional layers can have a different orientation to one another and/or to the longitudinal axis LA. In at least some examples, the fourth composite material CM4 in the second flange enlarged portion 142 can be quasi isotropic.

The composite structural element 100 can be manufactured as follows, for example. A suitable preform structure can be formed by laying multiple layers of fibers over one another, for example as disclosed above regarding the first flange portion 120, the first corner element 135, the web element 130, the second corner element 145 and the second flange element 140, the overlaid layers forming the required cross-section CCS, and the preform is impregnated with a suitable resin, for example a thermoset resin.

Figure 7:
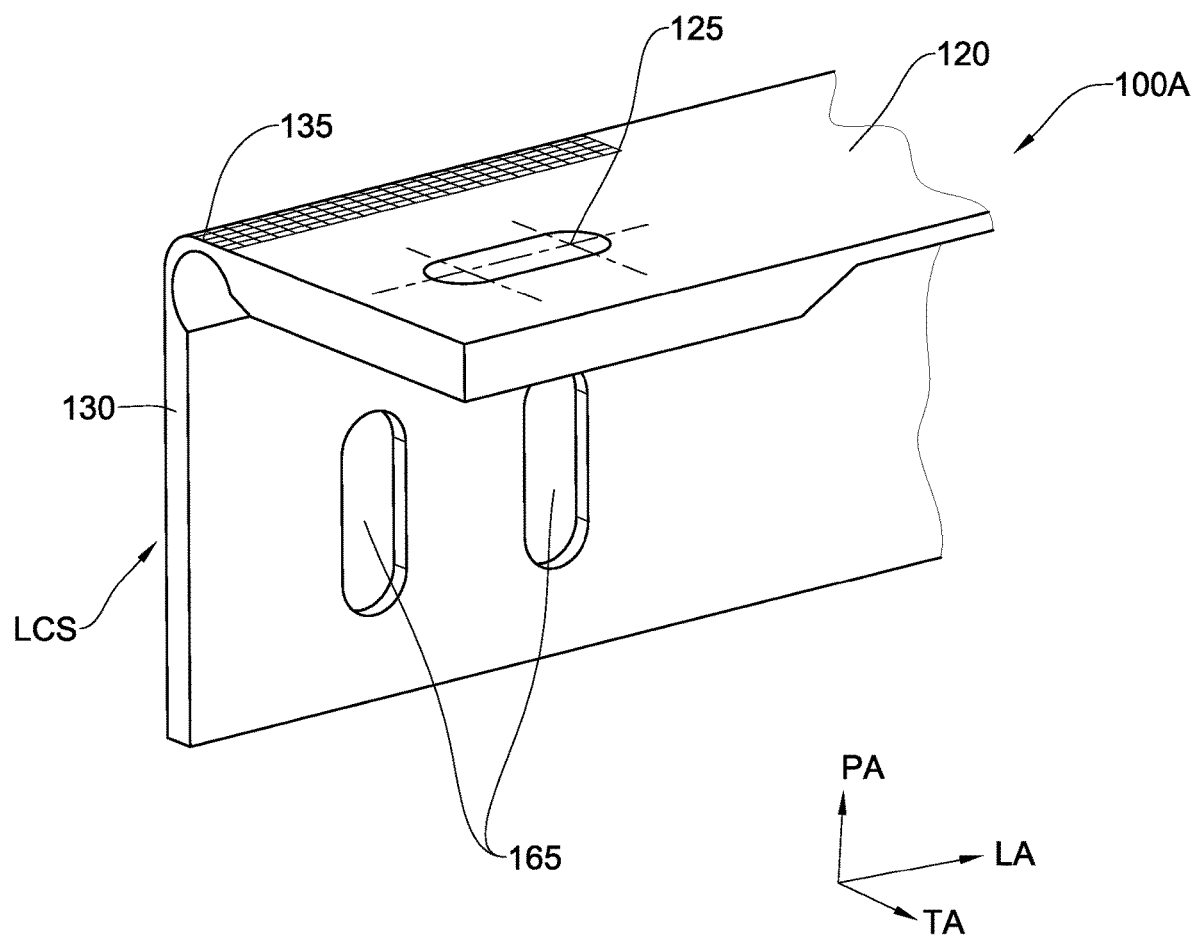
FIG. 7 illustrates in partial isometric view an alternative variation of the example of FIGS. 1 to 6 according to a first aspect of the presently disclosed subject matter.

FIG. 7 illustrates an alternative variation of the composite structural element of FIGS. 1 to 6. In the example of FIG. 7, the composite structural element, designated with reference numeral 100A, has an L-shaped transverse cross-section LCS. The composite structural element 100A is similar to the composite structural element 100, mutatis mutandis, and thus includes the first flange element 120 (including the enlarged portion 124), web element 130 and first corner element 135, in a similar manner as disclosed herein for the corresponding components (i.e., the corresponding first flange element 120 (including the enlarged portion 124), the corresponding web element 130 and the corresponding first corner element 135) of the composite structural element 100, but omits the second corner element 145 and the second flange element 140 of the composite structural element 100, mutatis mutandis.

Figure 8:
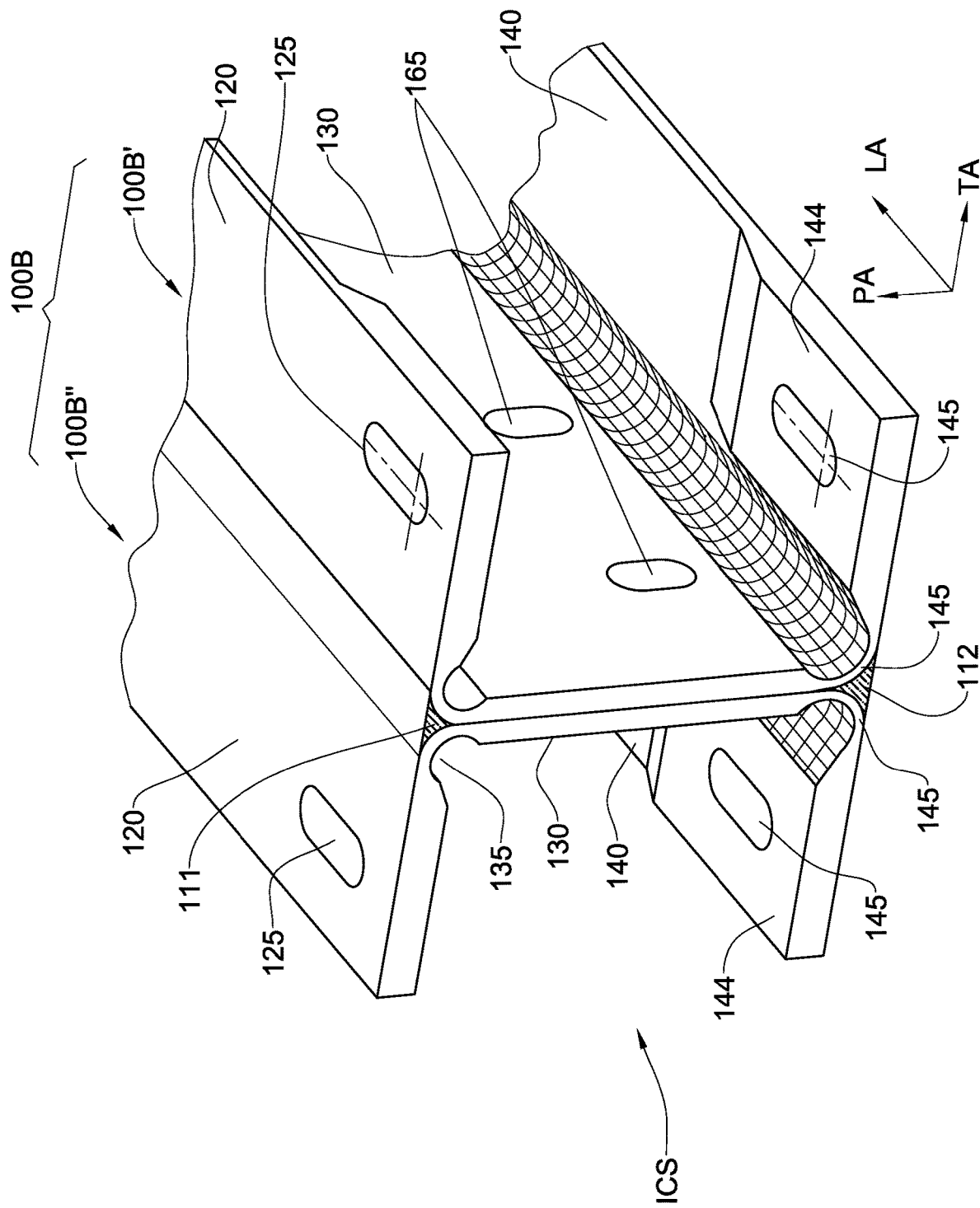
FIG. 8 illustrates in partial isometric view another alternative variation of the example of FIGS. 1 to 6 according to a first aspect of the presently disclosed subject matter.

FIG. 8 illustrates another alternative variation of the composite structural element of FIGS. 1 to 6. In the example of FIG. 8, the composite structural element, designated with reference numeral 100B, has an I-shaped transverse cross-section ICS. The composite structural element 100B is similar to the composite structural element 100, mutatis mutandis, and thus includes two such composite structural element 100, designated herein as composite structural element 100B' and composite structural element 100B". Each one of the composite structural element 100B' and composite structural element 100B" has a corresponding first flange element 120 (including the enlarged portion 124), a corresponding web element 130, a corresponding first corner element 135, a corresponding second corner element 145 and a corresponding second flange element 140 and enlarged portion 144, in a similar manner as disclosed herein for the corresponding components of the composite structural element 100 of FIGS. 1 to 6, mutatis mutandis. In the example of FIG. 8, the composite structural element 100B' and the composite structural element 100B" are joined together or are integrally formed in back-to-back configuration at the corresponding web elements 130. A first triangular plug 111 is provided between the corresponding first corner elements 135 of the composite structural element 100B' and composite structural element 100B", made from a suitable composite material or matrix material. A second triangular plug 112 is provided between the corresponding second corner elements 145 of the composite structural element 100B' and composite structural element 100B", made from a suitable composite material or matrix material.

Figure 9:
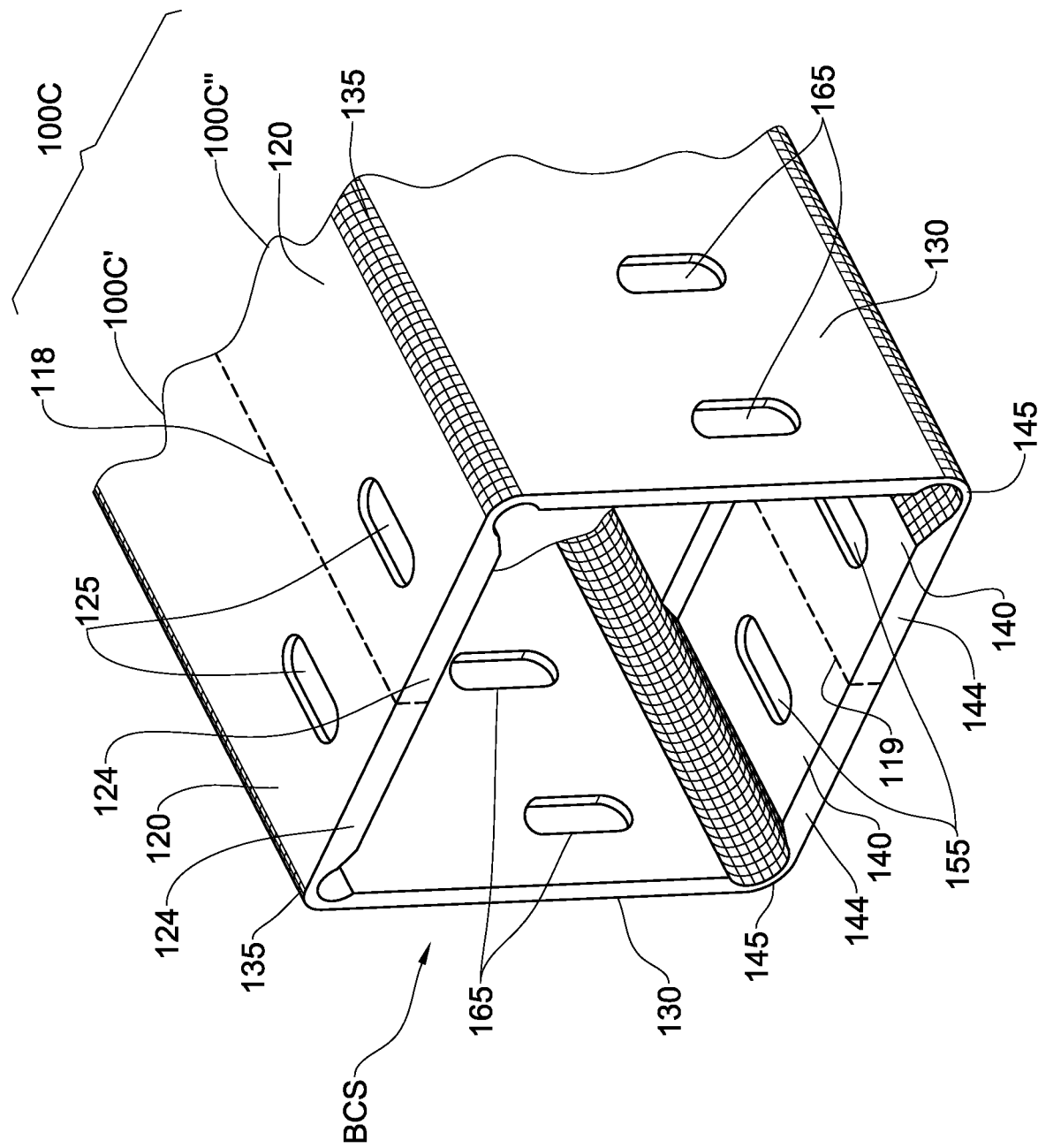
FIG. 9 illustrates in partial isometric view another alternative variation of the example of FIGS. 1 to 6 according to a first aspect of the presently disclosed subject matter.

FIG. 9 illustrates another alternative variation of the composite structural element of FIGS. 1 to 6. In the example of FIG. 9, the composite structural element, designated with reference numeral 100C, has a box-shaped transverse cross-section BCS. The composite structural element 100C is similar to the composite structural element 100, mutatis mutandis, and includes two such composite structural element 100, designated herein as composite structural element 100C' and composite structural element 100C". Each one of the composite structural element 100C' and composite structural element 100C" has a corresponding first flange element 120 (including the enlarged portion 124), a corresponding web element 130, a corresponding first corner element 135, a corresponding second corner element 145 and a corresponding second flange element 140 and enlarged portion 144, in a similar manner as disclosed herein for the corresponding components of the composite structural element 100 of FIGS. 1 to 6, mutatis mutandis. In the example of FIG. 9, the composite structural element 100C' and the composite structural element 100B" are joined together, or are integrally formed, in back-to-back configuration at the corresponding longitudinal edges (phantom line 118) of the corresponding first flange elements 120, and at the corresponding longitudinal edges (phantom line 119) of the corresponding second flange elements 140.

Each one of the composite structural members illustrated in FIGS. 7 to 9 can have one or more openings, corresponding to the one or more openings 125 and/or one or more openings 155 and/or one or more web openings 165 as disclosed herein regarding the composite structural member 100 of FIGS. 1 to 6, mutatis mutandis.

Figure 10:
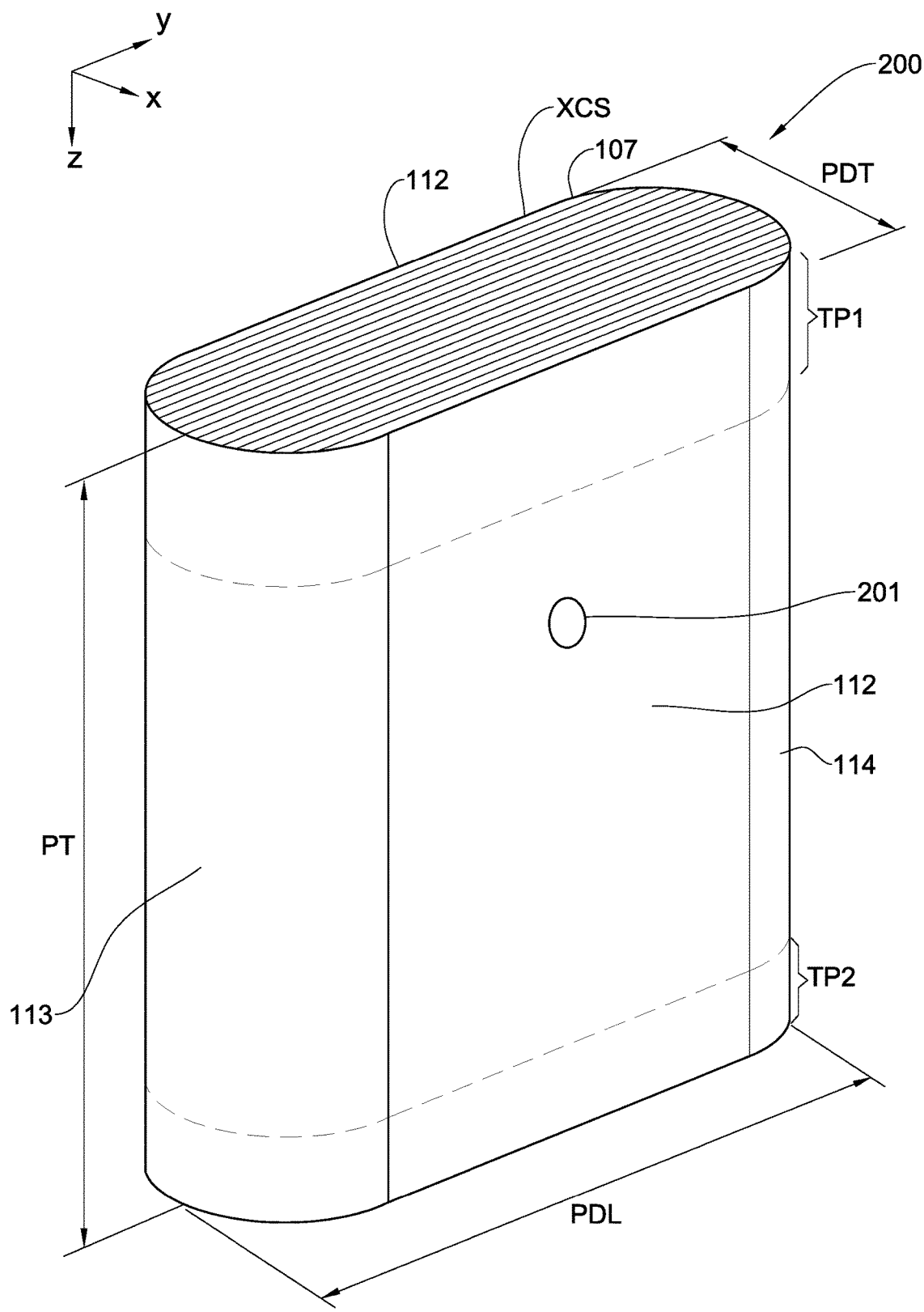
FIG. 10 illustrates in isometric view a first example of a composite structural member according to a second aspect of the presently disclosed subject matter.
Figure 10A:
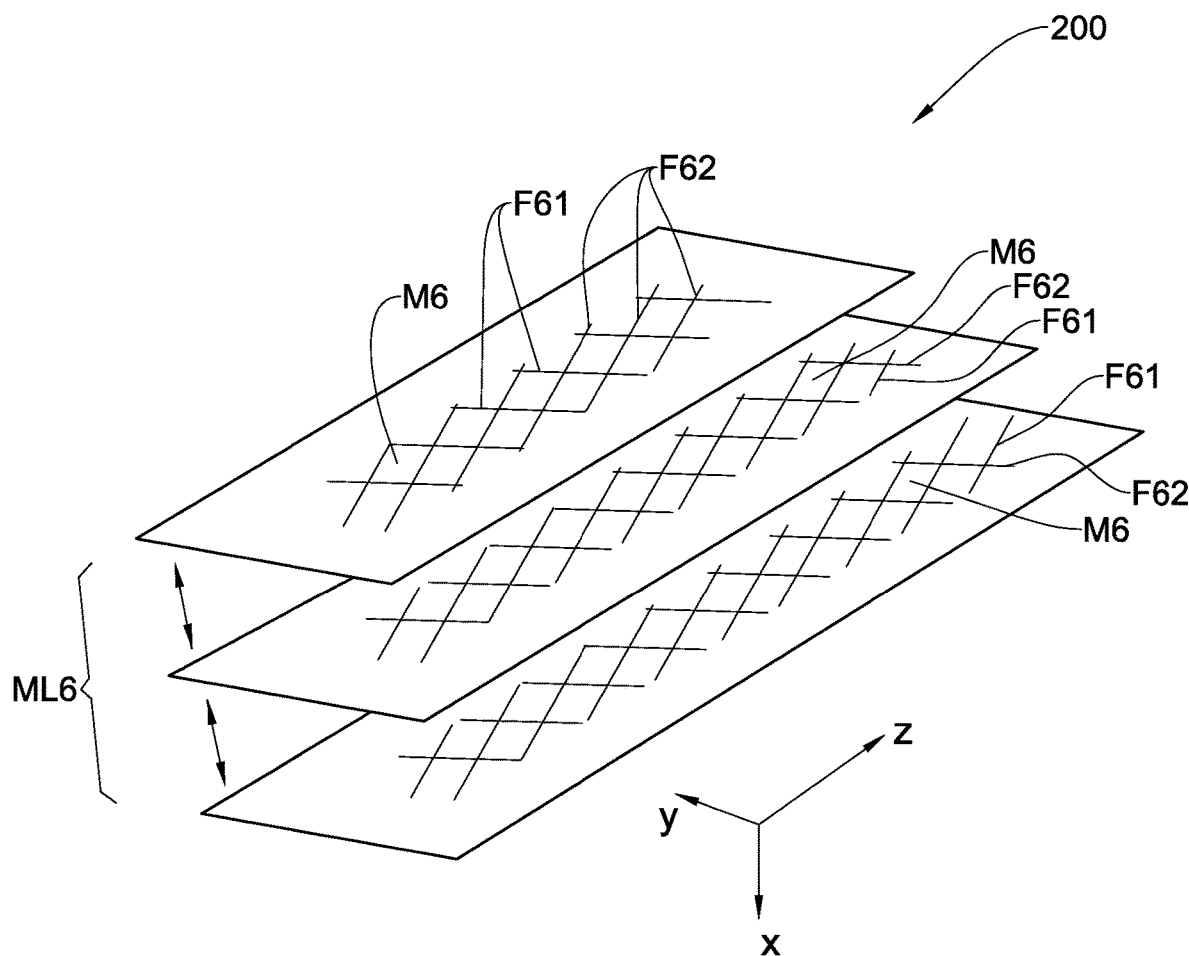
FIG. 10(a) schematically illustrates in exploded isometric view an arrangement of layers and the fibers in the composites materials used for the example of FIG. 10.

Referring to FIG. 10, a first example of a composite structural member, according to a second aspect of the presently disclosed subject matter, is generally designated 200 and is in the form of a structural peg.

In this example, the composite structural member 100 is extends along a z-axis, and has a closed elongate cross-sectional shape XCS along x-y planes orthogonal to the z-axis.

In this example, the composite structural member 200 is configured for being in load-bearing contact with at least the composite structural member 100. In particular, the composite structural member 200 is configured for being inserted into and provide load-bearing contact with one or both of first opening 125 and second opening 155, or for being inserted into and provide load-bearing contact with web opening 106. Thus, in at least this example, the cross-sectional shape XCS has a peg profile 107 that is essentially complementary to the opening profile 105 or opening profile 106, and has a longitudinal dimension PDL corresponding to and nominally equal to (taking into account mechanical tolerances) dimension DL of opening 105 or dimension WDL of opening 106. The cross-sectional shape XCS also has a transverse dimension PDT corresponding to and nominally equal to (taking into account mechanical tolerances) dimension DT of opening 105 or dimension WDT of opening 106.

In one example, dimension PDL can be 20 mm, dimension PDT can be 8 mm, and dimension PT can be 116 mm.

Thus, the peg profile 107 includes rounded end walls 113, 114, for example formed as half-cylindrical walls, spaced by side walls 112, which in this example are flat or rectilinear. In alternative variations of this example, side walls 112 are non-rectilinear, for example curved. In this example the peg profile 107 is uniform in size and shape along the depth dimension PT (along z-axis) of the composite structural member 200. In alternative variations of this example, the peg profile 107 is non-uniform in size and/or in shape along the depth dimension PT—for example the peg profile 107 has a uniform shape but a diminishing size along the depth dimension PT.

In alternative variations of this example, the peg profile 107 can have any other suitable shape, for example elliptical or super elliptical, in which the respective major axis is along the longitudinal axis LA.

In these and other examples, the peg profile 107 has its longer dimension (the longitudinal dimension DL) in the direction in which loads are to be transmitted via composite structural member 200 to the respective first opening 125, the second opening 155 or web opening 165. Such loads, as will become clearer herein, can include shear loads generally aligned with the longitudinal axis LA of the composite structural member 100, for example.

The composite structural member 200 is made from a sixth composite material CM6. In at least this example, and referring also to FIG. 10(*a*), the sixth composite material CM6 is made from a corresponding sixth plurality of corresponding first fibers F61 and a corresponding sixth plurality of corresponding second fibers F62 embedded in a matrix M6, for example as disclosed herein regarding the third composite material CM3, in particular the first fibers F31, second fibers F32, and matrix M3, mutatis mutandis. Thus, for example, such a matrix M6 for the sixth composite material CM6 can be a curable material such as for example epoxy resin, or any other suitable resinous matrix, thermoplastic resin or thermoset resin, and for example, the corresponding first fibers F61 and/or the corresponding second fibers F62 are carbon fibers or graphite fibers.

In this example, in the composite structural member 200 the corresponding first fibers F61 are orthogonal to the corresponding second fibers F61, and are oriented in a direction nominally 45° with respect to the z-axis. In alternative variations of this and other examples, the corresponding first fibers F61 and the corresponding second fibers F62 can have a different orientation to one another and/or to the z-axis.

It is to be noted that the composite structural member 200 can be formed as a multilayer fiber reinforced manner, in which multiple layers ML6 (each extending along planes parallel to the y-z plane) are laminated together, each such layer comprising the corresponding first fibers F61 and the corresponding second fibers F62 in the desired orientation with respect to the z-axis.

In at least this example, the composite structural member 200 can include one or more apertures 201, for example extending therethrough along a direction parallel to the x-axis. In alternative variations of this example, the aperture (s) can be omitted.

In a first example, and referring to FIG. 11, such a composite structural member 200 can be used for mechanically connecting a first structural support element 300 and a second support element 400 in a load bearing manner. For example, the first support element 300 can be configured, for example, as a spar for a wing, for example for use in a UAV, while the second support element 400 can be configured as the main spar of the wing center section.

For example the first support element 300 corresponds to composite structural member 100 as disclosed herein with reference to the example illustrated in FIGS. 1 to 6. Thus, first support element 300 includes first flange element 120 having enlarged portion 124 and opening 125, web element 130 and second flange element 140 having enlarged portion 144 and opening 155. The enlarged portions 124, 144 of the interface portion 115 define a space therebetween having a dimension FD1 along the peg axis PG between the facing surfaces 124F and 144F of the enlarged portions 124, 144, respectively.

For example, the second support element 400 can be similar to composite structural member 100 as disclosed herein with reference to the example illustrated in FIGS. 1 to 6, but modified so that the corresponding interface portion, designated herein with reference numeral 415, fits within the internal space IS defined between the enlarged portions 124, 144 of the corresponding interface portion 115 of the first support element 300. Thus, the respective first flange element 120 and second flange element 140 of the second support element 400 comprise modified corresponding enlarged portions 425, 445 in which the outer surfaces 425F, 445F of corresponding enlarged portions 425, 445, respectively, are spaced at dimension FD2 along the peg axis PG. The modified corresponding enlarged portions 425, 445 also include respective openings 425, 445 corresponding to openings 125, 155.

Dimensions FD1 and FD2 are identical, or dimension FD2 can be slightly smaller than dimension FD1, to ensure a tight fit of the interface portion 415 with respect to the interface portion 115.

A plug member 450 can optionally be provided between the inner facing faces of the modified corresponding enlarged portions 425, 445 to maintain the modified corresponding enlarged portions 425, 445 spaced at dimension FD2. The plug member 450 can be made from any suitable material, for example a plastic material or other polymeric materials, or other non-metallic materials, in particular materials that are non-corrosive when exposed to a maritime environment. The plug member 450 includes a channel CH in registry with the openings 425, 445.

Thus, the first structural support element 300 can be connected to the second support element 400 in a load bearing manner by first inserting the interface portion 415 into the interface portion 115, such that the surfaces 124F and 144F of the enlarged portions 124, 144 are in abutting and load bearing contact with outer surfaces 425F, 445F of corresponding enlarged portions 425, 445, respectively. Then, the composite structural member 200 according to the second aspect of the presently disclosed subject matter is inserted serially into the coaxially aligned openings 125, 425, channel CH, and openings 445, 155.

Referring also to FIG. 10, it is to be noted that a first portion TP1 of the composite structural member 200 is in load-bearing contact with the first flange elements 120 of the first structural support element 300 and the second support element 400 via openings 125, 425. It is also to be noted that a second portion TP2 of the composite structural member 200 is in load-bearing contact with the second flange elements 140 of the first structural support element 300 and the second support element 400 via openings 155, 445.

FIG. 12 provides an number of example calculations regarding predicted stresses and other mechanical parameters regarding the example of FIG. 11.

It is to be noted that in alternative variations of this example, the first support element 300 can instead correspond to composite structural member 100 as disclosed herein with reference to any one of the examples, or alternative variations thereof, illustrated in FIGS. 7 to 9; in such cases, the corresponding second support element 400 can still be similar to composite structural member 100 as disclosed herein with reference to the example illustrated in FIGS. 1 to 6, but with a correspondingly modified interface portion that can fit in load bearing contact with the interface portion of the first support element 300, for example in a similar manner to that disclosed herein for the example illustrated in FIGS. 10 to 12, mutatis mutandis.

In a second example, and referring to FIG. 13, such a composite structural member 200 can be used for mechanically connecting a first structural support element 800 and a second support element 700 in a load bearing manner. For example, the first support element 800 can be configured, for example, as a spar for a wing, for example for use in a UAV, while the second support element 700 is in the form of a fuselage frame, onto which it is desired to connect the wing spar. As in the first example, the first support element 800 corresponds to composite structural member 100 as disclosed herein with reference to the example illustrated in FIGS. 1 to 6. Thus, first support element 800 includes first flange element 120, web element 130 and second flange element 140, and including web opening 165 in web member 130.

Referring also to FIG. 14, in the second example, the second support element 700 is in the form of a fuselage frame, having an opening 768 corresponding to web opening 165 of the first structural element 800. For example, the second support element 700 is also made from composite or other non-metallic materials, in particular materials that are non-corrosive when exposed to a maritime environment.

In this example, the first structural support element 800 can be connected to the second support element 700 in a load bearing manner by aligning the web opening 165 with the frame opening 765, and then one or more composite structural members 200 according to the second aspect of the presently disclosed subject matter is inserted into the corresponding coaxially aligned openings 165 and 765, and geometrically locked in place.

In this example, at least a portion of each composite structural member 200 is in load-bearing contact with the web element 130 of the first structural support element 800 and the second support element 400 via the corresponding aligned openings 165, 765.

It is to be noted that in alternative variations of this example, the first support element 800 can instead correspond to composite structural member 100 as disclosed herein with reference to any one of the examples, or alternative variations thereof, illustrated in FIGS. 7 to 9. In such cases, one or more composite structural members 200 connect the corresponding first support element 800 with respect to the second support element 700 via corresponding one or more web openings provided in the first support element 800, for example in a similar manner to that disclosed herein for the example illustrated in FIGS. 10 to 12, mutatis mutandis.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A composite structural member, comprising:
   at least one first flange element made from a first composite material; and
   at least one first web element made from a second composite material;
   wherein said at least one first web element is connected to said at least one first flange element in a non-coplanar manner along a corresponding mutual first edge via a first corner element made from a third composite material, said mutual first edge extending along a first direction;
   wherein said third composite material is made from substantially only a corresponding first plurality of third composite material first fibers and a corresponding second plurality of third composite material second fibers embedded in a corresponding third composite material matrix in a non-parallel orientation with respect to said third composite material first fibers, each of the plurality of third composite material second fibers exhibiting substantially the same orientation, wherein said third composite material first fibers are nominally orthogonal to said mutual first edge or to said first direction;
   wherein said first corner element has a first thickness and said at least one first flange element has a second thickness, and wherein said first thickness is less than said second thickness.

2. The composite structural member according to claim 1, wherein said first composite material includes a corresponding first plurality of first composite material first fibers and a corresponding second plurality of first composite material second fibers embedded in a corresponding first composite material matrix in a non-parallel orientation with respect to said first composite material first fibers, wherein said first composite material first fibers are nominally orthogonal to said mutual first edge or to said first direction.

3. The composite structural member according to claim 1, wherein said second composite material includes a corresponding first plurality of second composite material first fibers and a corresponding second plurality of second composite material second fibers embedded in a corresponding second composite material matrix in a non-parallel orientation with respect to said second composite material first fibers, wherein said second composite material first fibers are oriented nominally at 45° to said mutual first edge or to said first direction.

4. The composite structural member according to claim 1, including one of the following:
   an interface portion, wherein said first flange element at the interface portion includes a first enlarged portion having a thickness greater than in other portions of the first flange element;
   an interface portion, wherein said first flange element at the interface portion includes a first enlarged portion having a thickness greater than in other portions of the first flange element, and comprising at least one first opening provided in said first enlarged portion; or
   an interface portion, wherein said first flange element at the interface portion includes a first enlarged portion having a thickness greater than in other portions of the first flange element, and comprising at least one first opening provided in said first enlarged portion, and wherein each said first opening having a length dimension greater than a width direction thereof.

5. The composite structural member according to claim 1, including one of the following:
   wherein said first corner element has a first internal radius, wherein said first internal radius is less than or equal to three times said first thickness;
   wherein said first corner element has a first internal radius, wherein said first internal radius is less than or equal to three times said first thickness, and wherein said first internal radius is less than or equal to twice times said first thickness;

wherein said first corner element has a first internal radius, wherein said first internal radius is less than or equal to three times said first thickness, and, wherein said first internal radius is less than or equal to said first thickness; or wherein said first corner element has a first internal radius, wherein said first internal radius is less than or equal to three times said first thickness, and wherein said first internal radius is less than or equal to twice times said first thickness, and wherein said first internal radius is less than or equal to said first thickness.

6. The composite structural member according to claim 1, wherein one said web element is connected to one said flange element in a non-coplanar manner along said corresponding mutual first edge to provide the composite structural element with an L-shaped transverse cross-section.

7. The composite structural member according to claim 1, further comprising:
   at least one second flange element made from a fourth composite material;
   wherein said at least one web element is connected to at least one said second flange element in a non-coplanar manner along a corresponding mutual second edge via a second corner element made from a fifth composite material, said mutual second edge extending along a second direction;
   wherein said fifth composite material including a corresponding first plurality of fifth composite material first fibers and a corresponding second plurality of fifth composite material second fibers embedded in a corresponding fifth composite material matrix in a non-parallel orientation with respect to said fifth composite material first fibers, wherein said fifth composite material first fibers are nominally orthogonal to said mutual second edge or to said second direction;
   wherein said second corner element has a third thickness.

8. The composite structural member according to claim 7, including one of the following:
   wherein said fourth composite material includes a corresponding first plurality of fourth composite material first fibers and a corresponding second plurality of fourth composite material second fibers embedded in a corresponding fourth composite material matrix in a non-parallel orientation with respect to said fourth composite material first fibers, wherein said fourth composite material first fibers are nominally orthogonal to said mutual second edge or to said second direction;
   wherein said second flange element at the interface portion includes a second enlarged portion having a corresponding thickness greater than in other portions of the second flange element;
   wherein said second flange element at the interface portion includes a second enlarged portion having a corresponding thickness greater than in other portions of the second flange element, and comprising at least one second opening provided in said second enlarged portion;
   wherein said second flange element at the interface portion includes a second enlarged portion having a corresponding thickness greater than in other portions of the second flange element, and comprising at least one second opening provided in said second enlarged portion, and wherein each said second opening having a length dimension greater than a width direction thereof;
   wherein said fourth composite material includes a corresponding first plurality of fourth composite material first fibers and a corresponding second plurality of fourth composite material second fibers embedded in a corresponding fourth composite material matrix in a non-parallel orientation with respect to said fourth composite material first fibers, wherein said fourth composite material first fibers are nominally orthogonal to said mutual second edge or to said second direction, and, wherein said second flange element at the interface portion includes a second enlarged portion having a corresponding thickness greater than in other portions of the second flange element;
   wherein said fourth composite material includes a corresponding first plurality of fourth composite material first fibers and a corresponding second plurality of fourth composite material second fibers embedded in a corresponding fourth composite material matrix in a non-parallel orientation with respect to said fourth composite material first fibers, wherein said fourth composite material first fibers are nominally orthogonal to said mutual second edge or to said second direction, and, wherein said second flange element at the interface portion includes a second enlarged portion having a corresponding thickness greater than in other portions of the second flange element, and comprising at least one second opening provided in said second enlarged portion; or
   wherein said fourth composite material includes a corresponding first plurality of fourth composite material first fibers and a corresponding second plurality of fourth composite material second fibers embedded in a corresponding fourth composite material matrix in a non-parallel orientation with respect to said fourth composite material first fibers, wherein said fourth composite material first fibers are nominally orthogonal to said mutual second edge or to said second direction, and, wherein said second flange element at the interface portion includes a second enlarged portion having a corresponding thickness greater than in other portions of the second flange element, and comprising at least one second opening provided in said second enlarged portion, and wherein each said second opening having a length dimension greater than a width direction thereof.

9. The composite structural member according to claim 7, including one of the following:
   wherein said second corner element has a second internal radius, wherein said second internal radius is less than or equal to three times said third thickness;
   wherein said second corner element has a second internal radius, wherein said second internal radius is less than or equal to three times said third thickness, and wherein said second internal radius is less than or equal to twice times said third thickness;
   wherein said second corner element has a second internal radius, wherein said second internal radius is less than or equal to three times said third thickness, and wherein said second internal radius is less than or equal to said third thickness; or
   wherein said second corner element has a second internal radius, wherein said second internal radius is less than or equal to three times said third thickness, and wherein said second internal radius is less than or equal to twice times said third thickness, and wherein said second internal radius is less than or equal to said third thickness.

10. The composite structural member according to claim 7, wherein said at least one second flange has a fifth thickness, and wherein said third thickness is less than said fifth thickness.

11. The composite structural member according to claim 7, wherein said third thickness remains nominally uniform, along a longitudinal length of the composite structural member at least up to an interface portion that is configured for connection to a desired structure.

12. The composite structural member according to claim 1, wherein one said web element connected to one said flange element in a non-coplanar manner along said corresponding mutual first edge, and wherein said web element is connected to one said second flange element in a non-coplanar manner along said corresponding mutual second edge to provide the composite structural element with a C-shaped transverse cross-section.

13. The composite structural member according to claim 1, further comprising at least one third opening provided in said web element.

14. The composite structural member according to claim 13, wherein said at least one third opening has a length dimension greater than a width direction thereof.

15. The composite structural member according to claim 1, wherein said at least one first web has a fourth thickness, and wherein said first thickness is less than said fourth thickness.

16. The composite structural member according to claim 1, wherein said first thickness remains nominally uniform along a longitudinal length of the composite structural member at least up to an interface portion that is configured for connection to a desired structure.

17. The composite structural member according to claim 1, wherein said third composite material second fibers are embedded in said third composite material matrix in a nominally orthogonal orientation with respect to said third composite material first fibers.

* * * * *